US012705932B2

(12) United States Patent
Hu et al.

(10) Patent No.: US 12,705,932 B2
(45) Date of Patent: Aug. 11, 2026

(54) FINGERPRINT ANTI-COUNTERFEITING PROCESSING METHOD AND APPARATUS, MEDIUM, SYSTEM AND DEVICE

(71) Applicant: HUIKE (SINGAPORE) HOLDING PTE.LTD., Singapore (SG)

(72) Inventors: Huiyi Hu, Shenzhen (CN); Mengjia Xiao, Shenzhen (CN)

(73) Assignee: HUIKE (SINGAPORE) HOLDING PTE.LTD., Singapore (SG)

( * ) Notice: Subject to any disclaimer, the term of this patent is extended or adjusted under 35 U.S.C. 154(b) by 0 days.

(21) Appl. No.: 19/226,254

(22) Filed: Jun. 3, 2025

(65) Prior Publication Data

US 2025/0292625 A1 Sep. 18, 2025

Related U.S. Application Data

(63) Continuation of application No. PCT/IB2024/058026, filed on Aug. 19, 2024.

(30) Foreign Application Priority Data

Aug. 24, 2023 (CN) ........................ 202311089410.3

(51) Int. Cl.
*G06V 40/40* (2022.01)
*G06V 10/50* (2022.01)
(Continued)

(52) U.S. Cl.
CPC .............. *G06V 40/40* (2022.01); *G06V 10/50* (2022.01); *G06V 10/54* (2022.01); *G06V 10/62* (2022.01);
(Continued)

(58) Field of Classification Search
CPC ......... G06V 40/12–1394; G06V 40/40; G06V 40/45
See application file for complete search history.

(56) References Cited

U.S. PATENT DOCUMENTS 9,396,382 B2 * 7/2016 Troy .................. G06V 40/1312
10,262,188 B2 4/2019 Agassy et al.
(Continued)

FOREIGN PATENT DOCUMENTS

AU 2009310362 A1 5/2010
CN 108009464 A 5/2018
(Continued)

OTHER PUBLICATIONS

First Office Action issued in Chinese Application No. 202311089410.3; mailed Aug. 12, 2024; 10 pages.
(Continued)

*Primary Examiner* — Patrick F Marinelli
(74) *Attorney, Agent, or Firm* — Zhong Law, LLC

(57) ABSTRACT

The present application provides a fingerprint anti-counterfeiting processing method and apparatus, a medium, a system and a device, and relates to the field of fingerprinting. The method includes: obtaining a fingerprinting request which includes a fingerprint to be identified; obtaining a preset first anti-counterfeiting index value corresponding to the fingerprint to be identified or a binary classification model established on the basis of the first anti-counterfeiting index value, and determining whether the fingerprint to be identified is a forged fingerprint on the basis of the first anti-counterfeiting index value or the binary classification model; wherein the first anti-counterfeiting index value is a value preset on the basis of obtained feature parameter values corresponding to the fingerprint to be identified and taken as a target fingerprint in different time sequences. Through the above method, according to the present application, the forged fingerprint may be efficiently identified, so that safety of fingerprinting is improved.

18 Claims, 10 Drawing Sheets

(51) Int. Cl.

| | |
|---|---|
| ***G06V 10/54*** | (2022.01) |
| ***G06V 10/62*** | (2022.01) |
| ***G06V 10/764*** | (2022.01) |
| ***G06V 40/12*** | (2022.01) |
| ***G06V 40/13*** | (2022.01) |

(52) U.S. Cl.

CPC ........ *G06V 10/764* (2022.01); *G06V 40/1306* (2022.01); *G06V 40/1359* (2022.01); *G06V 40/1365* (2022.01); *G06V 40/1382* (2022.01)

(56) References Cited

U.S. PATENT DOCUMENTS

| | | | | |
|---|---|---|---|---|
| 11,216,681 | B2 * | 1/2022 | Akhbari | G06V 40/1388 |
| 11,295,111 | B2 * | 4/2022 | Kim | G06V 40/1365 |
| 11,410,412 | B2 * | 8/2022 | Yang | G06V 40/45 |
| 12,333,849 | B2 * | 6/2025 | Zou | G06F 3/0433 |
| 2017/0004352 | A1 * | 1/2017 | Jonsson | G06V 40/1376 |
| 2020/0401782 | A1 * | 12/2020 | Cheng | G06V 40/1312 |
| 2020/0410268 | A1 * | 12/2020 | Akhbari | G06V 10/44 |
| 2021/0224514 | A1 * | 7/2021 | Yang | G06V 40/1353 |
| 2024/0412554 | A1 * | 12/2024 | Zou | G06V 40/1365 |
| 2025/0252784 | A1 * | 8/2025 | Tsai | G06V 40/45 |
| 2025/0292625 | A1 * | 9/2025 | Hu | G06V 40/40 |
| 2026/0030930 | A1 * | 1/2026 | Hu | G06V 40/45 |

FOREIGN PATENT DOCUMENTS

| | | | |
|---|---|---|---|
| CN | 109643379 | A | 4/2019 |
| CN | 110046564 | A | 7/2019 |
| CN | 110287866 | A | 9/2019 |
| CN | 112131905 | A | 12/2020 |
| CN | 115661946 | A | 1/2023 |
| KR | 20160117861 | A | 10/2016 |
| WO | 2020102945 | A1 | 5/2020 |

OTHER PUBLICATIONS

International Search Report and Written Opinion issued in PCT/IB2024/058026; mailed Dec. 3, 2024; 16 pages.

Gu, et al., "Development Status of Fingerprint Recognition Technology," Chinese Journal of Biomedical Engineering, vol. 36 No. 4, Aug. 2017, 36 pages.

First Office Action in Chinese Application No. 202311089410.3, issued Aug. 12, 2024.

Notice of Allowance in Chinese Application No. 202311089410.3, issued Oct. 24, 2024.

* cited by examiner

FINGERPRINT ANTI-COUNTERFEITING PROCESSING METHOD AND APPARATUS, MEDIUM, SYSTEM AND DEVICE

CROSS REFERENCE TO RELATED APPLICATIONS

The present application is a Continuation of International Application Number PCT/IB2024/058026 filed on Aug. 19, 2024, which claims priority to the Chinese patent application with an application number 202311089410.3 and titled "fingerprint anti-counterfeiting processing method and apparatus, medium, system and device", which is filed with the Patent Office of the People's Republic of China on Aug. 24, 2023, and the entire contents thereof are incorporated in the present applications by reference.

TECHNICAL FIELD

The present application relates to a fingerprinting technology, and especially relates to a fingerprint anti-counterfeiting processing method and apparatus, a medium, a system, and a device.

BACKGROUND

Fingerprinting is a technology for judging an identity of a system through information responded by the system, and has been widely applied to various electrical devices.

A present fingerprinting technology mainly carries out anti-counterfeiting identification on a fingerprint through identifying ridge-valley features of the fingerprint, and is easily cracked by 25D and 3D fake fingerprints, such fake fingerprints may simulate protrusions and recessions of ridges and valleys of the finger, and form acoustic impedance differences while being fitted with a screen, so as to obtain information which is consistent with a real fingerprint image, therefore, such fake fingerprints can smoothly pass through a fingerprint anti-counterfeiting system, and safety of a user is greatly reduced.

SUMMARY

The present application provides a fingerprint anti-counterfeiting processing method and apparatus, a medium, a system, and a device, and aims to solve a problem of low safety of a present fingerprint anti-counterfeiting system.

In a first aspect, the present application provides a fingerprint anti-counterfeiting processing method, and the fingerprint anti-counterfeiting processing method includes:

obtaining a fingerprinting request which includes a fingerprint to be identified;

obtaining a preset first anti-counterfeiting index value corresponding to the fingerprint to be identified or a binary classification model established on the basis of the first anti-counterfeiting index value, and determining whether the fingerprint to be identified is a forged fingerprint on the basis of the first anti-counterfeiting index value or the binary classification model;

wherein the first anti-counterfeiting index value is a value preset on the basis of obtained feature parameter values corresponding to the fingerprint to be identified and taken as a target fingerprint in different time sequences.

In an implementation manner, presetting the first anti-counterfeiting index value includes:

for each target fingerprint, obtaining feature parameter values of an epidermal layer and feature parameter values of a dermal layer, which respectively correspond to the target fingerprint in different time sequences; and respectively setting a first anti-counterfeiting index value corresponding to each target fingerprint on the basis of the feature parameter values of the epidermal layer and the feature parameter values of the dermal layer.

In an implementation manner, establishing the binary classification model includes:

training a preset binary classification model on the basis of the first anti-counterfeiting index value to obtain the binary classification model; and the determining whether the fingerprint to be identified is a forged fingerprint on the basis of the first anti-counterfeiting index value or the binary classification model includes:

analyzing the fingerprint to be identified through adopting the binary classification model to obtain a binary classification result, and determining whether the fingerprint to be identified is a forged fingerprint on the basis of the binary classification result.

In an implementation manner, the obtaining feature parameter values of an epidermal layer and feature parameter values of a dermal layer, which respectively correspond to the target fingerprint in different time sequences includes:

acquiring a first fingerprint image of the target fingerprint in a first time sequence, determining ridge positions and valley positions in the first fingerprint image, and obtaining a ridge parameter value and a valley parameter value of an epidermal layer according to the ridge positions and the valley positions in the first fingerprint image; and, acquiring a second fingerprint image of the target fingerprint in a second time sequence which has a preset time sequence difference with the first time sequence, determining ridge positions and valley positions in the second fingerprint image, and obtaining a ridge parameter value and a valley parameter value of a dermal layer according to the ridge positions and the valley positions in the second fingerprint image.

In an implementation manner, the respectively setting a first anti-counterfeiting index value corresponding to each target fingerprint on the basis of the feature parameter values of the epidermal layer and the feature parameter values of the dermal layer includes:

for each target fingerprint, obtaining a fingerprint contrast of the epidermal layer on the basis of the ridge parameter value and the valley parameter value of the epidermal layer, and obtaining a fingerprint contrast of the dermal layer on the basis of the ridge parameter value and the valley parameter value of the dermal layer; and determining an anti-counterfeiting index value in the first time sequence on the basis of the fingerprint contrast of the epidermal layer, the ridge parameter value and the valley parameter value of the epidermal layer, and determining an anti-counterfeiting index value in the second time sequence on the basis of the fingerprint contrast of the dermal layer, the ridge parameter value and the valley parameter value of the dermal layer; and setting a first anti-counterfeiting index value corresponding to the target fingerprint on the basis of the anti-counterfeiting index value in the first time sequence and the anti-counterfeiting index value in the second time sequence.

In an implementation manner, the respectively setting a first anti-counterfeiting index value corresponding to each target fingerprint on the basis of the feature parameter values of the epidermal layer and the feature parameter values of the dermal layer includes:

for each target fingerprint, determining a ridge parameter ratio value between the first time sequence and the second time sequence on the basis of the ridge parameter value of the epidermal layer and the ridge parameter value of the dermal layer; and determining a valley parameter ratio value between the first time sequence and the second time sequence on the basis of the valley parameter value of the epidermal layer and the valley parameter value of the dermal layer;

obtaining a fingerprint contrast of the epidermal layer on the basis of the ridge parameter value and the valley parameter value of the epidermal layer, and obtaining a fingerprint contrast of the dermal layer on the basis of the ridge parameter value and the valley parameter value of the dermal layer; and determining a contrast ratio value between the first time sequence and the second time sequence on the basis of the fingerprint contrast of the epidermal layer and the fingerprint contrast of the dermal layer; and determining anti-counterfeiting index values among the different time sequences on the basis of the ridge parameter ratio value, the valley parameter ratio value and the contrast ratio value between the first time sequence and the second time sequence, and setting a first anti-counterfeiting index value corresponding to the target fingerprint on the basis of the anti-counterfeiting index values among the different time sequences.

In an implementation manner, the obtaining feature parameter values of an epidermal layer and feature parameter values of a dermal layer, which respectively correspond to the target fingerprint in different time sequences includes:

acquiring a third fingerprint image of the target fingerprint in a third time sequence, obtaining a gradient of each pixel point in the third fingerprint image in a preset number of directions, and respectively taking a direction with the minimum gradient as a first gradient direction of each pixel point;

determining a first texture direction of a pixel block where each pixel point is located on the basis of the first gradient direction of each pixel point, and obtaining a texture direction feature value of the epidermal layer on the basis of the first texture directions of the pixel blocks; and acquiring a fourth fingerprint image of the target fingerprint in a fourth time sequence which has a preset time sequence difference with the third time sequence, obtaining a gradient of each pixel point in the fourth fingerprint image in the preset number of directions, and respectively taking a direction with the minimum gradient as a second gradient direction of each pixel point; and determining a second texture direction of a pixel block where each pixel point is located on the basis of the second gradient direction of each pixel point, and obtaining a texture direction feature value of the dermal layer on the basis of the second texture directions of the pixel blocks.

In an implementation manner, the respectively setting a first anti-counterfeiting index value corresponding to each target fingerprint on the basis of the feature parameter values of the epidermal layer and the feature parameter values of the dermal layer includes:

for each target fingerprint, obtaining a texture change rate of the target fingerprint on the basis of the texture direction feature value of the epidermal layer and the texture direction feature value of the dermal layer, and setting a first anti-counterfeiting index value corresponding to the target fingerprint on the basis of the texture change rate.

In an implementation manner, the obtaining a texture change rate of the target fingerprint on the basis of the texture direction feature value of the epidermal layer and the texture direction feature value of the dermal layer includes:

obtaining pixel blocks generating texture direction changes on the basis of the texture direction feature value of the epidermal layer and the texture direction feature value of the dermal layer, and marking the pixel blocks as overlay blocks; and determining a texture change rate of the target fingerprint on the basis of a ratio value between a number of the overlay blocks and a total number of the pixel blocks.

In an implementation manner, the method further includes:

obtaining a preset second anti-counterfeiting index value which is preset on the basis of a fitting parameter value corresponding to the fingerprint to be identified and taken as the target fingerprint; and the determining whether the fingerprint to be identified is a forged fingerprint on the basis of the first anti-counterfeiting index value or the binary classification model includes:

determining whether the fingerprint to be identified is a forged fingerprint on the basis of the first anti-counterfeiting index value and the second anti-counterfeiting index value; or determining whether the fingerprint to be identified is a forged fingerprint on the basis of a binary classification model established on the basis of the first anti-counterfeiting index value and the second anti-counterfeiting index value.

In an implementation manner, presetting the second anti-counterfeiting index value includes:

acquiring a fifth fingerprint image of the target fingerprint, and obtaining fingerprint gradient information of the pixel points in the fifth fingerprint image; and screening out valid fingerprint gradient information that meets a preset condition and the pixel points corresponding to the valid fingerprint gradient information from the fingerprint gradient information of the pixel points;

obtaining an valid gradient proportion of the target fingerprint on the basis of a number of the pixel points corresponding to the valid fingerprint gradient information; and/or, obtaining an average valid gradient value on the basis of the valid fingerprint gradient information and the number of the pixel points corresponding to the valid fingerprint gradient information; and obtaining a fitting parameter value of the target fingerprint on the basis of the valid gradient proportion and/or the average valid gradient value.

According to a second aspect of the present application, a fingerprint anti-counterfeiting processing apparatus is provided, and includes:

a first obtaining module, configured to obtain a fingerprinting request which includes a fingerprint to be identified;

a second obtaining module, configured to obtain a preset first anti-counterfeiting index value corresponding to the fingerprint to be identified or a binary classification model established on the basis of the first anti-counterfeiting index value; and a determination module, configured to determine whether the fingerprint to be identified is a forged fingerprint or not on the basis of the first anti-counterfeiting index value or the binary classification model;

wherein the first anti-counterfeiting index value is a value preset on the basis of obtained feature parameter values corresponding to the fingerprint to be identified and taken as a target fingerprint in different time sequences.

According to a third aspect of the present application, a computer storage medium is provided, where a computer-executable instruction is stored in the computer-readable storage medium, and the computer-executable instruction is used for realizing the fingerprint anti-counterfeiting processing method while being executed by a processor.

According to a fourth aspect of the present application, a fingerprint anti-counterfeiting system is provided, and includes an ultrasonic sensing apparatus and the fingerprint anti-counterfeiting processing apparatus, wherein the fingerprint anti-counterfeiting processing apparatus is used for being electrically connected with the ultrasonic sensing apparatus to realize ultrasonic fingerprint anti-counterfeiting detection.

According to a fifth aspect of the present application, an electronic device is provided, and includes the fingerprint anti-counterfeiting processing system.

According to the fingerprint anti-counterfeiting processing method and apparatus, the medium, the system and the device which are provided by the present application, in consideration of that a forged fingerprint has larger changes in fingerprint feature parameters in different time sequences compared to a real fingerprint, when the fingerprinting request is obtained, the preset first anti-counterfeiting index value corresponding to the fingerprint to be identified or the corresponding binary classification model is obtained to carry out anti-counterfeiting identification on the fingerprint to be identified, the anti-counterfeiting index value is set through the obtained fingerprint feature data of the target fingerprint in the different time sequences, and the forged fingerprint may be efficiently identified during fingerprinting, so that safety of the fingerprinting is effectively improved.

BRIEF DESCRIPTION OF DRAWINGS

In order to describe the technical solutions in the examples of the present application or in the prior art more clearly, a brief introduction for the drawings required in the description for the examples or the prior art will be provided below, apparently, the drawings in the description below show merely some examples of the present application, and those of ordinary skill in the art may also derive other drawings from these drawings without making creative efforts.

DETAILED DESCRIPTION OF THE EMBODIMENTS

Figure 1:
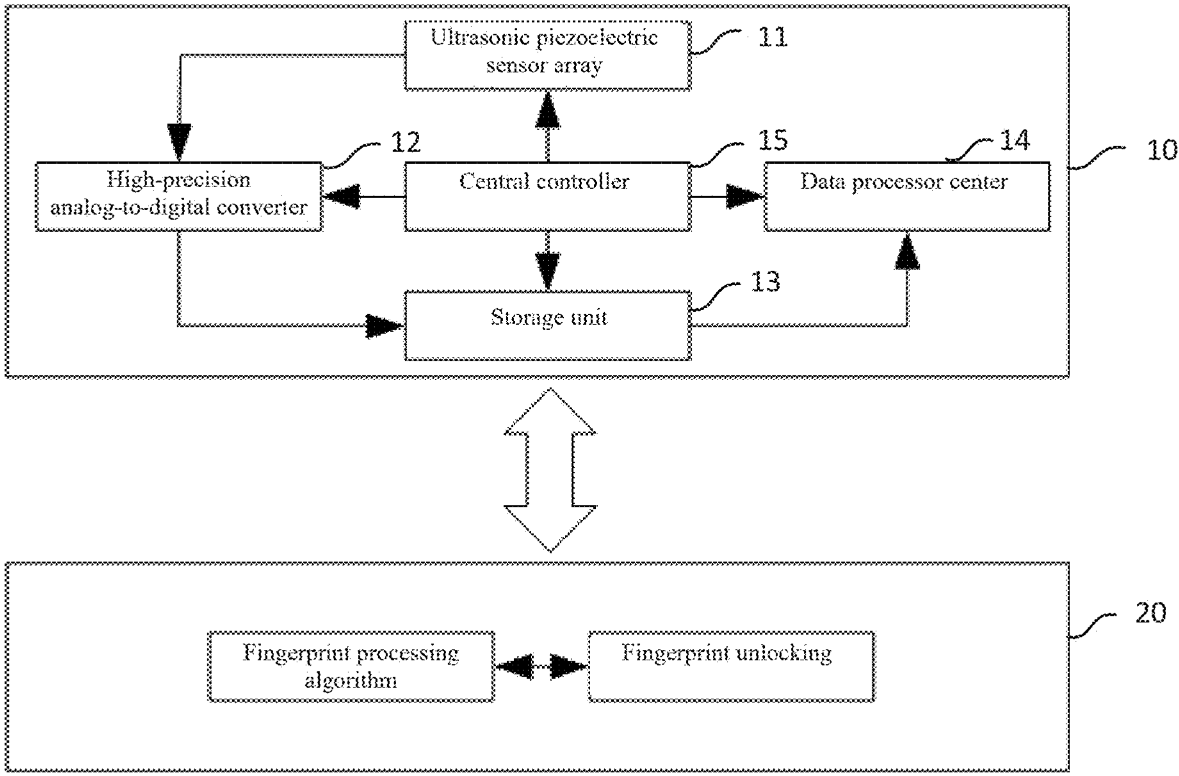
FIG. 1 is a schematic diagram of a possible application scene provided by an example of the present application.

In order to make the objectives, technical solutions, and advantages of the examples of the present application clearer, the technical solutions in the examples of the present application are clearly and completely described below in combination with the drawings in the examples of the present application, and apparently, the examples described are merely a part rather than all of the examples of the present application. On the basis of the examples in the present application, all other examples obtained by those of ordinary skill in the art without creative efforts shall fall within the protection scope of the present application.

Before the example of the present application is described, the following terms are explained firstly: ridge and valley: the ridges and valleys both belong to fingerprint patterns, respectively represent protruded or recessed patterns, and are represented as parts with higher signal intensity or lower signal intensity in fingerprint data; and contrast: is a difference value between the ridges and the valleys in the fingerprint data, and represents signal intensity of a fingerprint.

The example of the present application is described below in combination with an application scene, and the fingerprint anti-counterfeiting processing method provided by the example of the present application may be applied to an application scene of ultrasonic fingerprint unlocking, and more specifically, may be applied to an application scene of ultrasonic fingerprinting of an intelligent electronic device. For example, the fingerprint anti-counterfeiting processing method is applied to a personal electronic device such as a mobile phone or a computer, and may also be applied to the fields of other electronic devices such as financial payment, an access control system, and an identity certificate.

Ultrasonic fingerprinting is used for creating a fingerprint vision image through obtaining intensity of reflected sound waves from a screen to a fingerprint and air. Being different from optical imaging, a piezoelectric transducer in an ultrasonic sensor generates ultra-high frequency sound waves which may penetrate through an epidermal layer of a skin, an image is formed through measuring energy of the reflected waves, influence caused by surface details of the fingerprint is low, and fingerprint recognition can still be performed even under contaminated or wet hand conditions. Compared with capacitive and optical fingerprinting in the related art, the identification is more advantageous in terms of safety (anti-counterfeiting) and accuracy, however, an ultrasonic fingerprint technology is more easily cracked by 25D and 3D fake fingerprints, such fake fingerprints may simulate protrusions and recessions of ridges and valleys of a finger, and form acoustic impedance differences while being fitted with the screen to obtain information which is consistent with a real fingerprint image, and can pass through identification and anti-counterfeiting systems, so that safety of a user is greatly reduced.

Figure 2A:
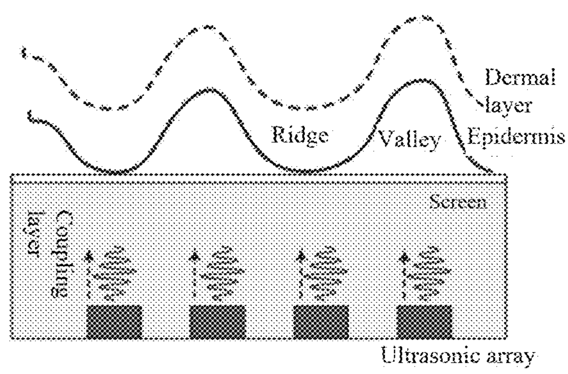
FIG. 2A is a schematic diagram of an ultrasonic signal transmission model.
Figure 2B:
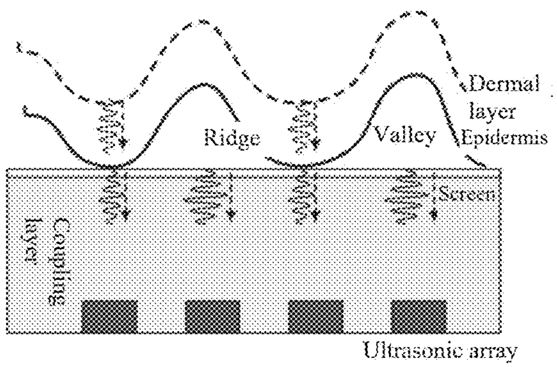
FIG. 2B is a schematic diagram of an ultrasonic signal reception model.
Figure 3A:
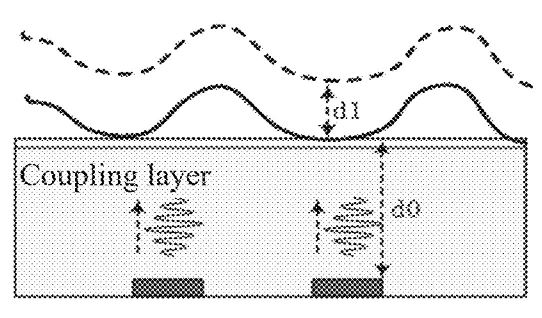
FIG. 3A is a schematic diagram of the ultrasonic signal reception model when a real finger presses.
Figure 3B:
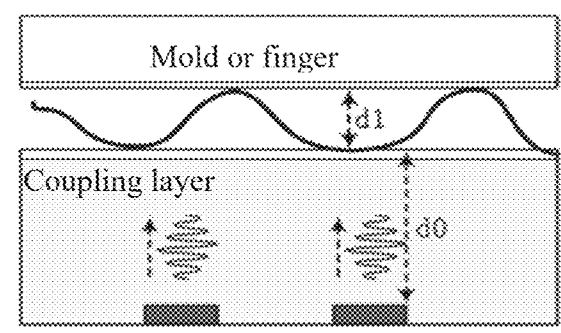
FIG. 3B is one of schematic diagrams of the ultrasonic signal reception model when a mold or a fake finger presses.
Figure 3C:
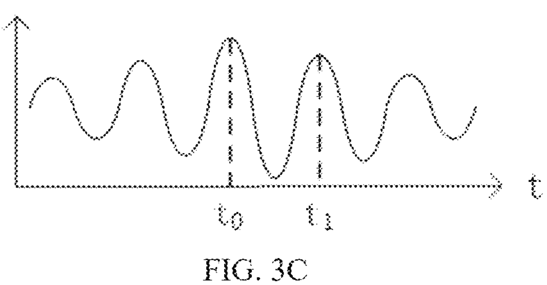
FIG. 3C is a schematic diagram of an echo signal when a real finger presses.
Figure 3D:
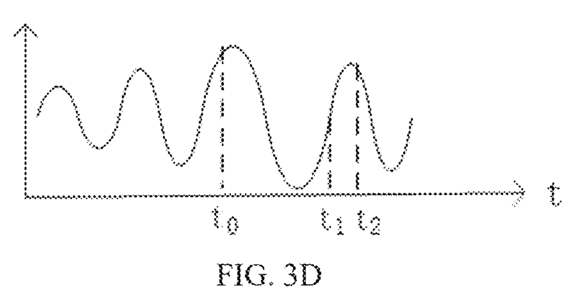
FIG. 3D is a schematic diagram of the echo signal when a mold or a fake finger presses.

In view of this, the embodiment of the present application provides a fingerprint anti-counterfeiting processing method and apparatus, a medium, a system, and a device. FIG. 1 is a schematic diagram of an application scene of ultrasonic fingerprinting provided by the present application, and as shown in FIG. 1, an ultrasonic sensing apparatus 10 and an anti-counterfeiting server 20 electrically connected with the ultrasonic sensing apparatus 10 are included; the ultrasonic sensing apparatus 10 includes an ultrasonic piezoelectric sensor 11, an analog-to-digital converter 12, a storage unit 13, and a data processing center 14, wherein the ultrasonic piezoelectric sensor 11, the analog-to-digital converter 12, the storage unit 13, and the data processing center 14 are electrically connected with a central controller 15 respectively; the ultrasonic piezoelectric sensor 11 may be a PVDF ultrasonic array sensor, and is used for completing excitation for an ultrasonic array and reception for an echo signal; a high-precision analog-to-digital converter may be adopted as the analog-to-digital converter 12, and is used for converting analog echo signals into a digital intensity signal, the digital intensity signal is transmitted to the data processing center 14 through the storage unit 13 to complete preliminary processing for fingerprint data, and the processed fingerprint data is transmitted to the anti-counterfeiting server 20; and the anti-counterfeiting server 20 carries out further processing by means of a fingerprint processing algorithm to complete related functions of fingerprint registration, fingerprinting unlocking, etc. (A real finger) ultrasonic signal transmission and reception models are shown in FIG. 2A and FIG. 2B.

According to the embodiment of the present application, in consideration of that in an actual application, the real finger of a human body includes an epidermal layer and a dermal layer, and a mold or a fake finger cannot distinguish between the dermal layer and the epidermal layer, so that a fingerprint is usually simulated in a manner of simulating a thickness of the epidermal layer and a thickness of the dermal layer. In combination with FIG. 3A to FIG. 3D, a thickness of a coupling layer is recorded as $d_0$, a sound velocity in the coupling layer is $c_0$, a thickness of a screen is ignored, a thickness from the dermis of the finger to the epidermis is $d_1$, and a sound velocity is $c_1$, then time when the sensor receives an epidermal echo is $t_0$, and time when the sensor receives a dermal layer echo is $t_1$. A sound velocity of a sound wave in a material of a fake finger is $c_2$, and a thickness of a fake fingerprint is $d_1$, then time when a deep texture echo is received is $t_2$, if $c_1=c_2$, an echo signal received at time $t_1$ or $t_2$ is a surface texture of a pressed object, if $c_1<c_2$, a deep texture echo signal has not been received at time $t_1$, if $c_1>c_2$, the deep texture echo signal has already passed at $t_1$, and when $c_1<c_2$ or $c_1>c_2$, there is a difference between a deep texture and an epidermal texture, so that the real finger and the fake finger may be identified through comparing the differences of the echo signal received in different time sequences. Calculation formulas for $t_0$, $t_1$, and $t_1$ are as follows:

$$t_0 = 2 * \frac{d_0}{c_0}$$

$$t_1 = t_0 + 2 * \frac{d_1}{c_1}$$

$$t_1 = t_0 + 2 * \frac{d_1}{c_2}$$

Figure 4:
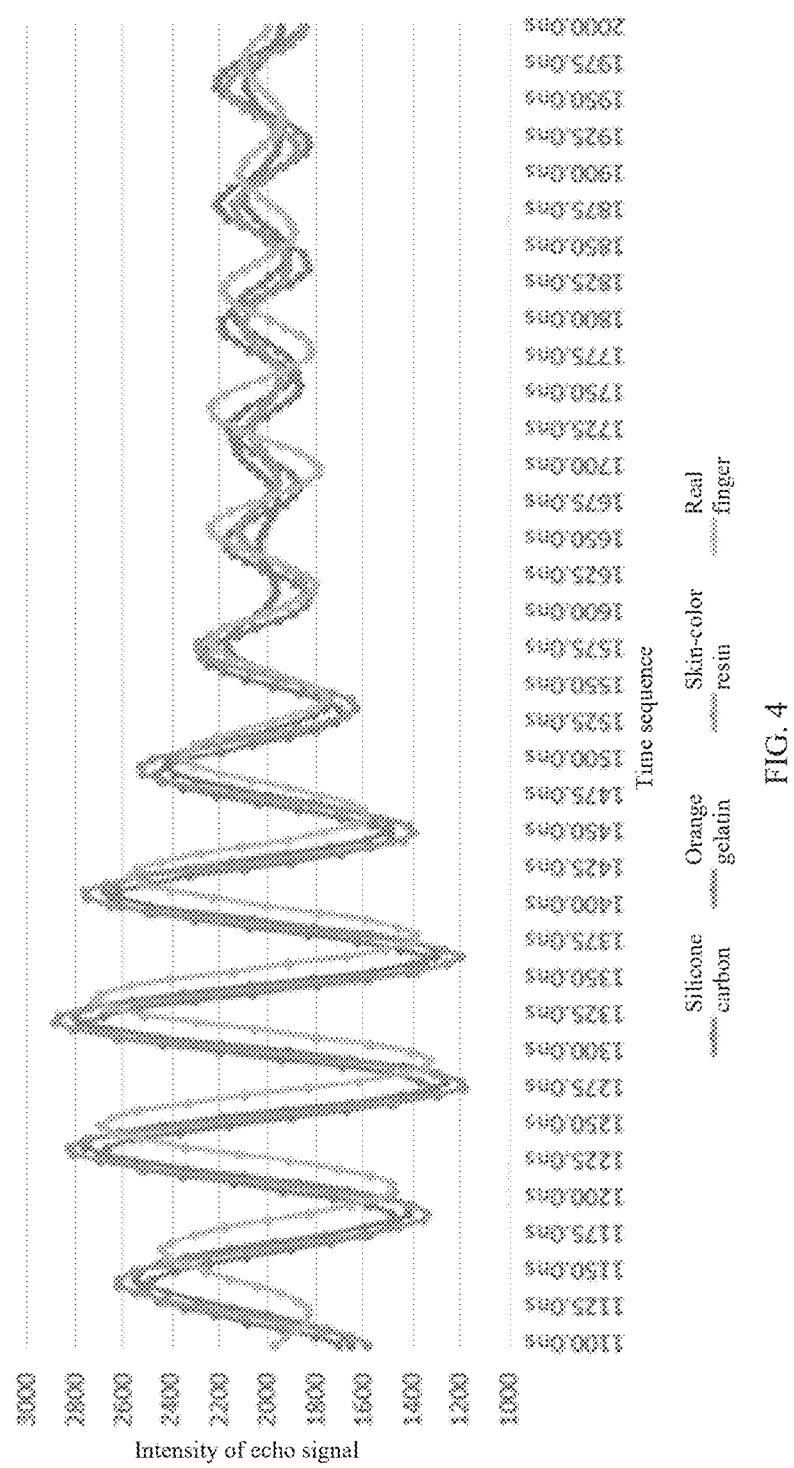
FIG. 4 is a comparison diagram of echo signals of different fingerprints.
Figure 5:
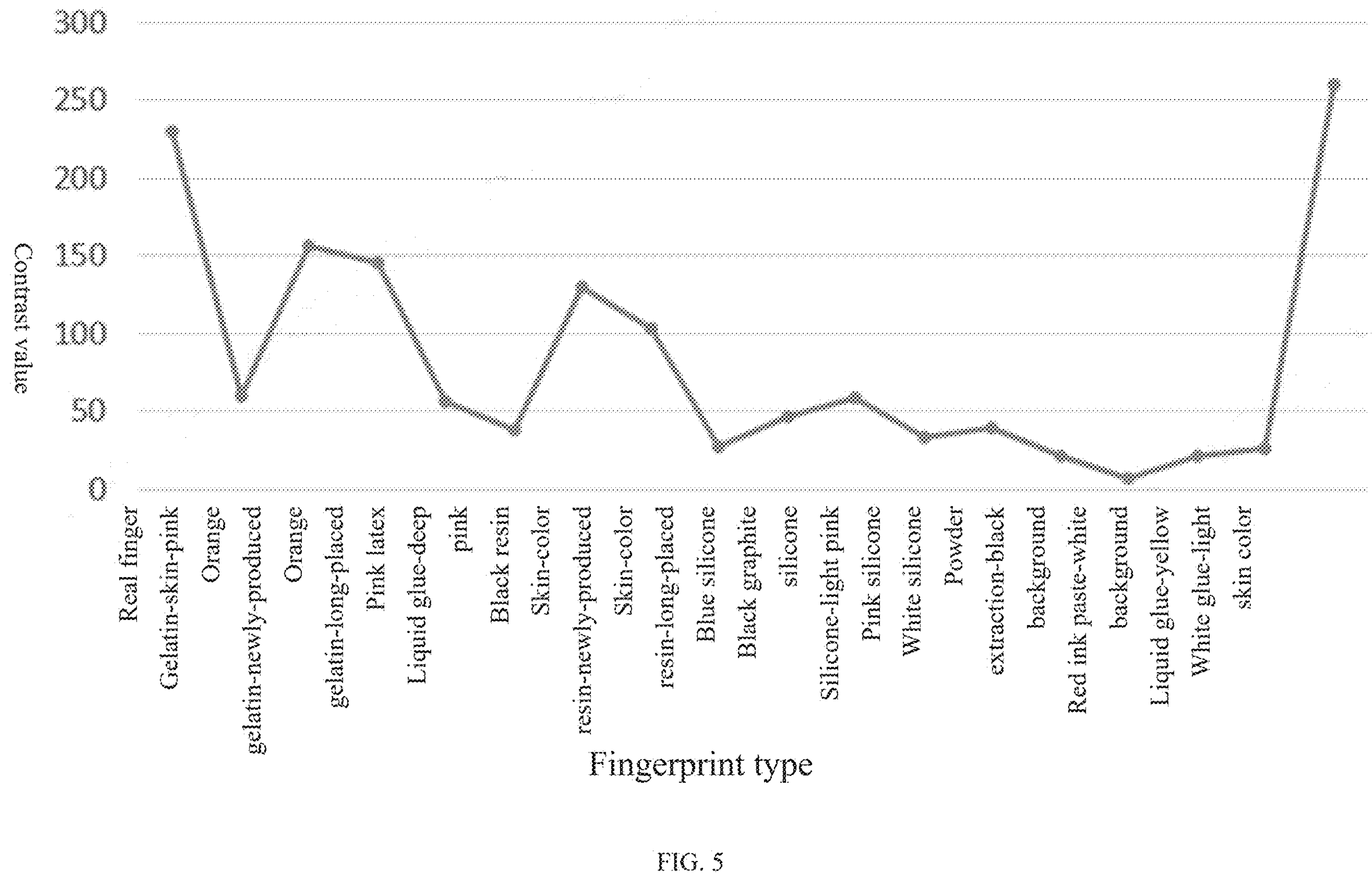
FIG. 5 is a comparison diagram of contrasts of epidermal layers of different fingerprints.

Moreover, there are large acoustic impedance differences between the real finger and other materials for producing the fake finger, therefore, there are differences in the sound velocity in the different materials, then the echo signal of the fingerprint is influenced, so that not only do there exist differences in signal amounts of the fingerprint, but there are also certain changes in texture feature representations of the real finger and the fake finger. As shown in FIG. 4, these differences are due to different acoustic parameters of the materials, signal values of the different materials in the same time sequence may be inconsistent, and the time sequence at a location of the maximum echo signal may also be inconsistent. Moreover, there are large differences in contrasts of epidermal layers of the fingerprints between the real finger and the fake fingers made of the different materials (through taking an average number of a large amount of data), as shown in FIG. 5.

Compared with fingerprint processing algorithms in the related art, in the embodiment when a fingerprinting request is received, anti-counterfeiting identification is carried out on a fingerprint to be identified through obtaining a preset anti-counterfeiting index value or a corresponding binary classification model, where the anti-counterfeiting index value is set through pre-obtained fingerprint feature data of a target fingerprint in different time sequences, and in an identification process, safety of fingerprinting may be effectively improved by means of the anti-counterfeiting index value or the binary classification model which is determined by fingerprint features and changes thereof in the different time sequences. Further, ridge-valley parameters and contrast values of the target fingerprint in the different time sequences are calculated respectively, and a ridge-valley ratio value and a contrast ratio value among the time sequences are calculated; and change rates of fingerprint textures of the fingerprint in the different time sequences are compared according to texture direction fields of the fingerprint in the different time sequences, so that a real fingerprint and a fake fingerprint are distinguished; and in addition, the fingerprint to be identified is identified in combination with a second anti-counterfeiting index value set on the basis of a fitting parameter of the target fingerprint, so that an identification anti-counterfeiting effect on the real finger and the fake finger may be further improved.

The technical solutions of the present application will be described in detail below in combination with specific embodiments by taking the anti-counterfeiting server 20 applied in the above application scene as an example. The several specific embodiments may be combined with each other, and the same or similar concepts or processes may not be repeated in some examples.

Figure 6:
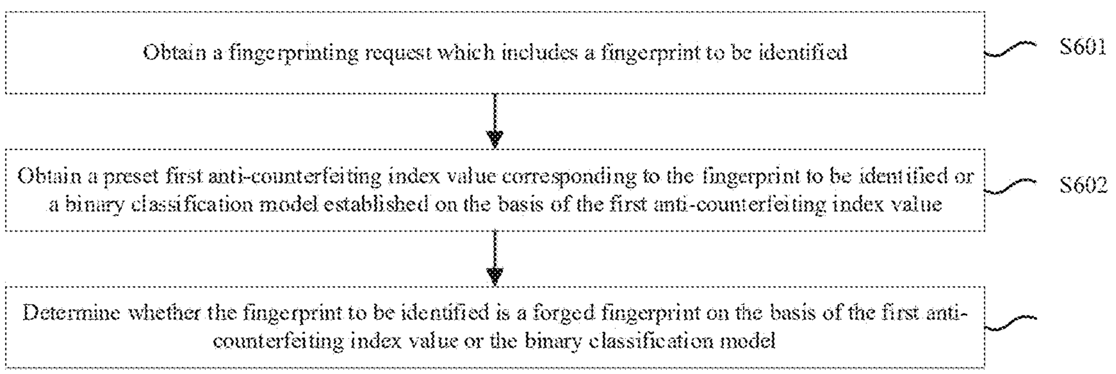
FIG. 6 is a schematic flow diagram of a fingerprint anti-counterfeiting processing method provided by the example of the present application.

FIG. 6 is a schematic flow diagram of a fingerprint anti-counterfeiting processing method provided by the embodiment of the present application, and steps S601 to S603 are included.

Step S601, obtaining a fingerprinting request which includes a fingerprint to be identified.

Screen-opening unlocking of a mobile phone is taken as an example, a user presses a finger at a position corresponding to a fingerprint acquisition function module of the mobile phone to trigger a fingerprinting request, and the anti-counterfeiting server obtains a fingerprint to be identified, of the user, and executes subsequent fingerprint anti-counterfeiting identification, where the fingerprint to be identified may include fingerprint feature data in two different time sequences, the different time sequences may correspond to two different time sequences under feature parameter values of a target fingerprint, and a time sequence difference between the two different time sequences may be in a range of 1100 ns to 2000 ns.

Step S602, obtaining a preset first anti-counterfeiting index value corresponding to the fingerprint to be identified or a binary classification model established on the basis of the first anti-counterfeiting index value; wherein the first anti-counterfeiting index value is a value preset on the basis of obtained feature parameter values corresponding to the fingerprint to be identified and taken as a target fingerprint in different time sequences.

In the related art, a fingerprint image of the fingerprint to be identified is usually matched with stored authentication fingerprint images to compare fingerprint features in the fingerprint to be identified and in the authentication fingerprint images, such as comparing consistency or similarity among ridge-valley features, and then whether the fingerprint to be identified is an authentication fingerprint is identified. The process is easily cracked by a high-simulation fake finger, and does not achieve a good anti-counterfeiting effect.

In the embodiment, after the fingerprinting request is obtained, the first anti-counterfeiting index value corresponding to the fingerprint to be identified is obtained, or the binary classification model established according to the first anti-counterfeiting index value is obtained, the fingerprint anti-counterfeiting identification is carried out by means of the first anti-counterfeiting index value or the binary classification model in the subsequent steps, the first anti-counterfeiting index value or the corresponding binary classification model is preset according to the feature parameter values corresponding to the fingerprint to be identified and taken as the target fingerprint in the different time sequences, and changes in features of the real finger in the different time sequences are considered, so that an anti-counterfeiting effect on the fake finger is improved.

It may be understood that, the fingerprint to be identified is taken as the target fingerprint, that is, a fingerprint of the real finger, which corresponds to the fingerprint to be identified is taken as the target fingerprint. The first anti-counterfeiting index value is a value preset according to the feature parameter values corresponding to the target fingerprint in the different time sequences, it is taken as an example that the feature parameter value is a ridge parameter value, the ridge parameter value of the fingerprint at 1100 ns is 143.7, and the ridge parameter of the fingerprint at 1900 ns is 143.9, and those skilled in the art may set a reasonable range value according to the ridge parameter values in the different time sequences and in combination with an actual application, such as between 143.5 and 144.0, and/or may set a change range value of the ridge parameters in the different time sequences, such as between 0.2 and 0.5. It needs to be noted that, those skilled in the art may adaptively set a value range of the first anti-counterfeiting index value in combination with an actual application and a large number of real finger fingerprint samples, and the example only serves as a possible illustration for the above value range, and does not provide a specific limitation.

In some embodiments, in consideration of that in an actual application, in addition to an identification scene of an imitation fake finger of an authentication fingerprint (i.e. a target fingerprint), there are also some identification scenes of non-authentication fingerprints or non-imitation fingerprints, such as a fingerprinting request initiated by a user without fingerprint authentication, and in order to increase fingerprinting efficiency of a system, after step S601 and before step S602, in the embodiment, initial identification may further be carried out on the fingerprint to be identified, the process may be realized on the basis of the prior art, similarity between the fingerprint to be identified and the stored authentication fingerprints is judged, the fingerprint with the highest similarity is screened out, and if the similarity is greater than or equal to a similarity threshold value, the process proceeds to step S602, and the corresponding first anti-counterfeiting index value is obtained, that is, the first anti-counterfeiting index value set on the basis of the fingerprint screened out. If the similarity is lower than the similarity threshold value, it indicates that there is a large difference between the fingerprint to be identified and the authentication fingerprints, and the fingerprint to be identified is a non-authentication fingerprint or a non-imitation fingerprint, and it may be directly determined that the fingerprinting is not passed.

Step S603, determining whether the fingerprint to be identified is a forged fingerprint on the basis of the first anti-counterfeiting index value or the binary classification model.

In an implementation manner, feature values corresponding to the first anti-counterfeiting index value in the fingerprint to be identified are obtained, and compared with the first anti-counterfeiting index value, and if the feature values meet a range corresponding to the first anti-counterfeiting index value, it indicates that the fingerprint to be identified is a target fingerprint, otherwise, the fingerprint to be identified is a forged fingerprint. For example, the first anti-counterfeiting index value is set according to a ridge parameter value of the target fingerprint at 1100 ns and a ridge parameter value of the fingerprint at 1900 ns, a change range value of the ridge parameters among different time sequences is set to be 0.2 to 0.5, and whether the ridge parameter change of the fingerprint to be identified in the two time sequences is in the range of 0.2 to 0.5 is judged through obtaining the ridge parameter value of the fingerprint to be identified at 1100 ns and the ridge parameter value of the fingerprint to be identified at 1900 ns.

In another implementation manner, in order to further increase the fingerprinting efficiency, the binary classification model may be trained according to the first anti-counterfeiting index value, and during fingerprinting, fingerprint feature data of the fingerprint to be identified in different time sequences are input into the binary classification model, and whether the fingerprint to be identified is a target fingerprint or a forged fingerprint is judged according to an output result of the binary classification model.

It may be seen that, in the embodiment, anti-counterfeiting identification is carried out on the fingerprint to be identified by means of the first anti-counterfeiting index value preset according to the fingerprint feature data of the target fingerprint in the different time sequences, or the corresponding binary classification model, and compared with identification only with regard to features of static ridges and valleys of a finger in the related art, which is easily cracked by a high-simulation fake fingerprint, in the embodiment, the fingerprint feature data of the fingerprint in the different time sequences are considered, so that the anti-counterfeiting effect on the fake finger is effectively improved, and then safety of the fingerprinting process is ensured.

Figure 7:
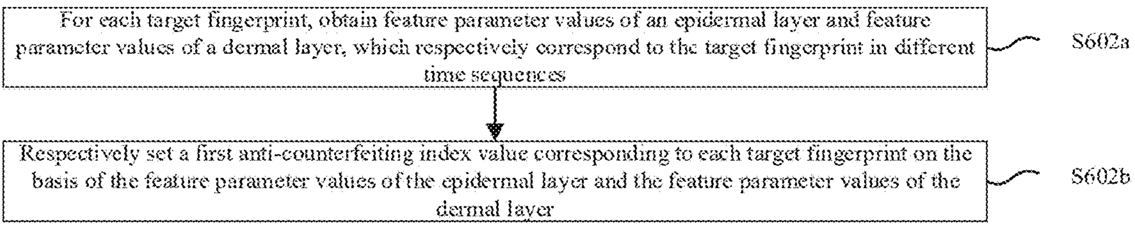
FIG. 7 is a schematic flow diagram of step S602 in FIG. 6.

In an implementation manner, in the above step S602, presetting the first anti-counterfeiting index value, as shown in FIG. 7, may include the following steps:

- step S602*a*, for each target fingerprint, obtaining feature parameter values of an epidermal layer and feature parameter values of a dermal layer, which respectively correspond to the target fingerprint in different time sequences; and
- step S602*b*, respectively setting a first anti-counterfeiting index value corresponding to each target fingerprint on the basis of the feature parameter values of the epidermal layer and the feature parameter values of the dermal layer.

It may be understood that, in the embodiment, each target fingerprint is all the authentication fingerprints of the anti-counterfeiting server.

With increase in production types of fake fingerprints, an effect of carrying out anti-counterfeiting only through single-frame fingerprint data or fingerprint textures is low, in the embodiment, in consideration of biological features of a human body, a real finger consists of an epidermal layer and a dermal layer, wherein feature parameters of the epidermal layer and the dermal layer are usually consistent or have negligible differences, while a fake fingerprint is not provided with a dermal layer and an epidermal layer, and can usually only simulate depth (i.e. thickness) information between the dermal layer and the epidermal layer, and large changes are easily generated in the different time sequences due to acoustic impedance differences of the fake fingerprint, therefore, in the embodiment, the real fingerprint and the fake fingerprint can be well distinguished through obtaining the corresponding feature parameter values of the epidermal layer and the corresponding feature parameter value of the dermal layer in the different time sequences, and setting the first anti-counterfeiting index value on the basis of the corresponding feature parameter values, and the anti-counterfeiting purpose is achieved.

In an implementation manner, establishing the binary classification model may include the following steps:

- training a preset binary classification model on the basis of the first anti-counterfeiting index value to obtain the binary classification model; and
- then in the step S603, the determining whether the fingerprint to be identified is a forged fingerprint on the basis of the first anti-counterfeiting index value or the binary classification model may include the following steps:
- analyzing the fingerprint to be identified through adopting the binary classification model to obtain a binary classification result, and determining whether the fingerprint to be identified is a forged fingerprint on the basis of the binary classification result.

In the embodiment, a support vector machine (SVM) model may be adopted as the preset binary classification model, and a basic model thereof is a linear classifier with the largest interval and defined in a feature space, and the optimal separation hyperplane is obtained by means of interval maximization.

In some embodiments, when the fingerprint to be identified is verified, in order to further increase the accuracy of fingerprint anti-counterfeiting, in addition to the first anti-counterfeiting index value, other anti-counterfeiting index values are further included, such as the second anti-counterfeiting index value set on the basis of the fingerprint fitting parameter, which is mentioned later, the SVM model may be trained by means of the anti-counterfeiting index values, and during the fingerprinting, feature data corresponding to the fingerprint to be identified are input into the trained model, and whether the fingerprint to be identified is a forged fingerprint may be rapidly determined according to a binary classification output result.

In an implementation manner, in consideration of that ridge-valley parameters of the epidermal layer and ridge-valley parameters of the dermal layer of the finger have certain features and change rules, the first anti-counterfeiting index value may be set by means of the ridge-valley parameter values of the fingerprint, and in the above step, obtaining feature parameter values of the epidermal layer and feature parameter values of the dermal layer, which respectively correspond to the target fingerprint in different time sequences may include the following steps:

- acquiring a first fingerprint image of the target fingerprint in a first time sequence, determining ridge positions and valley positions in the first fingerprint image, and obtaining a ridge parameter value and a valley parameter value of an epidermal layer according to the ridge positions and the valley positions in the first fingerprint image; and,
- acquiring a second fingerprint image of the target fingerprint in a second time sequence which has a preset time sequence difference with the first time sequence, determining ridge positions and valley positions in the second fingerprint image, and obtaining a ridge parameter value and a valley parameter value of a dermal layer according to the ridge positions and the valley positions in the second fingerprint image.

In the embodiment, the fingerprint images in the different time sequences may be acquired by means of ultrasonic waves, for example, the fingerprint image of the epidermal layer is acquired at 1100 ns, the fingerprint image of the dermal layer of a person is acquired at 1900 ns, ridge positions and valley positions in the fingerprint images are calculated respectively, then all ridge values and valley values in the fingerprint images are counted respectively, and ridge/valley parameter values in the different time sequences are obtained respectively through a mean value algorithm.

In an application that the feature parameter values of the epidermal layer in the different time sequences include ridge/valley parameter values, at least two implementation manners below may be adopted to set the corresponding first anti-counterfeiting index value.

Manner 1: in the above step, respectively setting a first anti-counterfeiting index value corresponding to each target fingerprint on the basis of the feature parameter values of the epidermal layer and the feature parameter values of the dermal layer may include the following steps:

for each target fingerprint, obtaining a fingerprint contrast of the epidermal layer on the basis of the ridge parameter value and the valley parameter value of the epidermal layer, and obtaining a fingerprint contrast of the dermal layer on the basis of the ridge parameter value and the valley parameter value of the dermal layer; and determining an anti-counterfeiting index value in the first time sequence on the basis of the fingerprint contrast of the epidermal layer, and the ridge parameter value and the valley parameter value of the epidermal layer, and determining an anti-counterfeiting index value in the second time sequence on the basis of the fingerprint contrast of the dermal layer, and the ridge parameter value and the valley parameter value of the dermal layer; and setting a first anti-counterfeiting index value corresponding to the target fingerprint on the basis of the anti-counterfeiting index value in the first time sequence and the anti-counterfeiting index value in the second time sequence.

In the embodiment, the first anti-counterfeiting index value is determined according to the ridge/valley parameter values and fingerprint contrasts in the different time sequences, wherein the fingerprint contrast is equal to the ridge parameter value minus the valley parameter value, and may represent signal intensity of the fingerprint.

In an example, the first anti-counterfeiting index value is set on the basis of the anti-counterfeiting index value in the first time sequence and the anti-counterfeiting index value in the second time sequence, the first anti-counterfeiting index value may respectively include a ridge/valley parameter value and a fingerprint contrast threshold value in the first time sequence, and during fingerprinting, comparisons between the ridge/valley parameter value and the fingerprint contrast, and corresponding threshold values in the first time sequence are respectively carried out on the fingerprint to be identified, and if the ridge/valley parameter value and the fingerprint contrast are both within threshold value ranges, the identification is passed, otherwise, it is determined that the fingerprint to be identified is a forged fingerprint.

Manner 2: in the above step, respectively setting a first anti-counterfeiting index value corresponding to each target fingerprint on the basis of the feature parameter values of the epidermal layer and the feature parameter values of the dermal layer may include the following steps:

for each target fingerprint, determining a ridge parameter ratio value between the first time sequence and the second time sequence on the basis of the ridge parameter value of the epidermal layer and the ridge parameter value of the dermal layer; and determining a valley parameter ratio value between the first time sequence and the second time sequence on the basis of the valley parameter value of the epidermal layer and the valley parameter value of the dermal layer;

obtaining a fingerprint contrast of the epidermal layer on the basis of the ridge parameter value and the valley parameter value of the epidermal layer, and obtaining a fingerprint contrast of the dermal layer on the basis of the ridge parameter value and the valley parameter value of the dermal layer; and determining a contrast ratio value between the first time sequence and the second time sequence on the basis of the fingerprint contrast of the epidermal layer and the fingerprint contrast of the dermal layer; and determining anti-counterfeiting index values among the different time sequences on the basis of the ridge parameter ratio value, the valley parameter ratio value and the contrast ratio value between the first time sequence and the second time sequence, and setting a first anti-counterfeiting index value corresponding to the target fingerprint on the basis of the anti-counterfeiting index values among the different time sequences.

Compared with the above manner 1, due to the fact that acoustic impedance of some materials may be close to that of the finger, using only indexes such as a contrast in a certain time sequence is not sufficient, and in the embodiment, the real finger and the fake finger are distinguished through calculating the contrasts and the ridge-valley ratio values in two time sequences, and then controlling threshold value ranges of the ratio indexes between the two time sequences. The ratio indexes are added to the distinguishing for the real finger and the fake finger, so that a distinguishing degree for the real fingerprint and the fake fingerprint is increased, and the anti-counterfeiting performance is optimized.

Specifically, in the embodiment, the setting for the first anti-counterfeiting index value is determined on the basis of anti-counterfeiting index values among the different time sequences (referred to as among the time sequences), that is, the setting is determined on the basis of fingerprint feature parameter changes among the different time sequences. Specifically, a contrast value among the time sequences is equal to a fingerprint contrast of the dermis in the second time sequence divided by a fingerprint contrast of the epidermis in the first temporal sequence, and a ridge/valley parameter ratio value among the time sequences is equal to a ridge (valley) parameter value of the dermis in the second time sequence divided by a ridge (valley) parameter value of the epidermis in the first time sequence. Due to the fact that the fingerprint feature data of the dermal layer and the fingerprint feature data of the epidermal layer of the real finger are consistent, the contrast ratio value and the ridge-valley parameter ratio value among the time sequences usually have small differences, in the embodiment, the first anti-counterfeiting index value is set according to the contrast ratio value and the ridge-valley parameter ratio value among the time sequences, and when the fingerprint to be identified exceeds the corresponding threshold value ranges, the fingerprint to be identified may be identified to be a forged fingerprint.

In some embodiments, the first anti-counterfeiting index value may be determined simultaneously in the above manner 1 and manner 2, that is, the first anti-counterfeiting index value is determined according to the anti-counterfeiting index values in the different time sequences and the index anti-counterfeiting values among the different time sequences. During the fingerprinting, the information of the fingerprint to be identified needs to be compared with the anti-counterfeiting index values in the different time sequences and the index anti-counterfeiting values among the different time sequences simultaneously, so that the anti-counterfeiting effect is further improved.

In another implementation manner, in consideration of that sound propagation is time-dependent, the longer the time, the farther a distance of sound wave transmission, and a sound wave signal is reflected after reaching the epidermis for the first time, and a part of the sound wave passes through the epidermis and continues to be transmitted to a deep layer, and is reflected again after reaching the dermal layer, so that echo signals received at different time may represent textures with different depths. In the example, the fingerprint images in the different time sequences are formed in one pressing on the basis of the consistency design of the epidermal textures and the dermal textures of the human fingerprint, and the fingerprint anti-counterfeiting performance is improved through comparing the texture differences. Specifically, in the above step, the obtaining feature parameter values of an epidermal layer and feature parameter values of a dermal layer, which respectively correspond to the target fingerprint in different time sequences may include the following steps:

- acquiring a third fingerprint image of the target fingerprint in a third time sequence, obtaining gradients of each pixel point in the third fingerprint image in a preset number of directions, and respectively taking a direction with the minimum gradient as a first gradient direction of each pixel point;
- determining a first texture direction of a pixel block where each pixel point is located on the basis of the first gradient direction of each pixel point, and obtaining a texture direction feature value of the epidermal layer on the basis of the first texture directions of the pixel blocks; and,
- acquiring a fourth fingerprint image of the target fingerprint in a fourth time sequence which has a preset time sequence difference with the third time sequence, obtaining gradients of each pixel point in the fourth fingerprint image in a preset number of directions, and respectively taking a direction with the minimum gradient as a second gradient direction of each pixel point; and
- determining a second texture direction of a pixel block where each pixel point is located on the basis of the second gradient direction of each pixel point, and obtaining a texture direction feature value of the dermal layer on the basis of the second texture directions of the pixel blocks.

In comparison to common algorithms that use a direction operator convolution to find the direction that makes the convolution result the largest or smallest as the direction of the point, in this embodiment, the fingerprint texture direction feature value is computed. Specifically, the gradient of a single pixel point is calculated using the pixels of the point within its preset neighborhood (for example, a 5×5 neighborhood), and the direction of the smallest gradient is taken as the direction of that pixel point, and the direction is defined according to blocks, the fingerprint image is divided into a preset number of pixel blocks (for example, 8×8 large blocks), and is extended to a direction of the blocks from the direction of the pixel point, an accurate fingerprint direction field is obtained, and the first anti-counterfeiting index value may be determined by means of the texture direction feature values in the different time sequences, or changes in the directions of the blocks in the different time sequences are compared in the subsequent steps, and then the texture change rates of the pixel blocks in the different time sequences are obtained, so that the anti-counterfeiting index value is further determined.

Figures 8A, 8B, 8C:
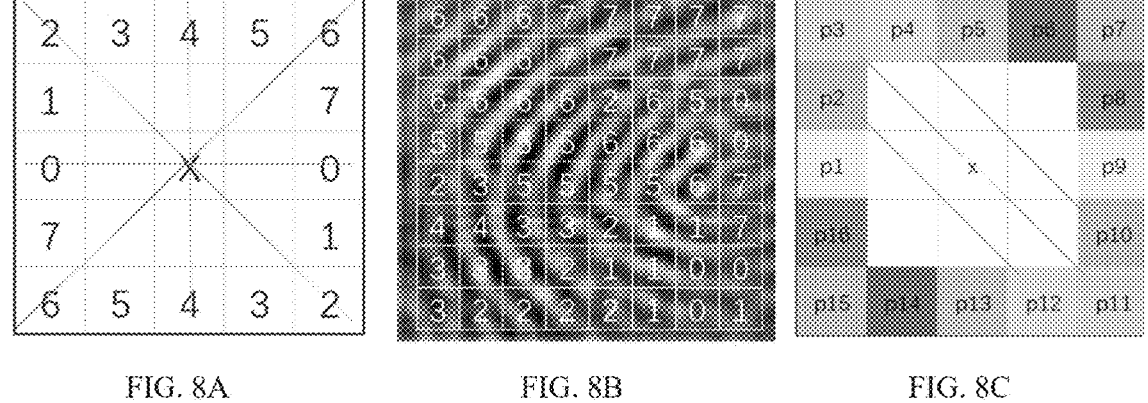
FIG. 8A is a schematic diagram of a fingerprint direction in the example of the present application.
FIG. 8B is a schematic diagram of pixel blocks in the example of the present application.
FIG. 8C is a schematic diagram of texture direction calculation in the example of the present application.

For ease of understanding, in combination with FIG. 8A to FIG. 8C, a fingerprint direction is defined as shown in FIG. 8A, numbers 0 to 7 in FIG. 8A respectively represent eight different directions, a certain pixel point x is taken as the center, a fingerprint texture trend is divided into eight directions in a 5×5 neighborhood of the pixel point x, the whole fingerprint image may be divided into 8×8 pixel blocks, and a texture direction of each pixel block is marked, as shown in FIG. 8B, so that the texture changes of the pixel blocks are compared.

A gradient of each pixel point in a preset number of directions in the third/fourth fingerprint image (hereinafter referred to as an image) is obtained, and a direction with the minimum gradient is taken as a first/second gradient direction of each pixel point, and the following steps may be included:

step 1: taking a certain pixel point x in the image, taking pixel values of a surrounding 5×5 neighborhood, and calculating gradients in eight directions.

Step 2: in combination with FIG. 8C, carrying out gradient calculation in three parallel line directions of a certain direction, and a formula is as follows:

$$Grad_i = \text{abs}(p_{i+1} - p_{i+8}) + \text{abs}(p_{i+2} - p_{i+6}) + \text{abs}(p_i - p_{i+9})$$

wherein $\text{Grad}_i$ represents a gradient of the pixel point in the i-th direction, i=0, 1, . . . , 7, and $p_i$ represents a neighborhood pixel point in the i-th direction.

Step 3: taking the minimum gradient in the 5×5 neighborhood of each pixel point as the gradient direction of the pixel point, and a formula is as follows:

$$\text{Min}_{Grad_i} = argmin(Grad_0, Grad_1, Grad_2, Grad_3, Grad_4, Grad_5, Grad_6, Grad_7)$$

After the gradient direction of the pixel point is obtained, in the embodiment, a texture direction of a pixel block where each pixel point is located is determined according to the gradient direction of the pixel point, and a texture direction feature value of the epidermal layer/dermal layer is obtained on the basis of the texture directions of the pixel blocks, specifically, step 4: extending point direction calculation to block direction calculation, and counting a direction Block0F with the highest frequency of occurrence in each block as the texture direction of the block, and a formula is as follows:

$$BlcokOF = \max(Cnt_{Grad_i})$$

wherein $\text{Cnt}_{Grad_i}$ represents frequency or times of occurrence in the i-th direction.

It needs to be noted that, in the embodiment, the third time sequence may be the same with or different from the first time sequence, and the fourth time sequence may be the same with or different from the second time sequence. In the embodiment, the first, the second, the third, the fourth, etc. are used for distinguishing similar objects without other special meanings.

Compared with the setting the first anti-counterfeiting index value by means of the parameter values such as the ridge-valley parameters between the epidermal layer and the dermal layer in the above manner, in the embodiment, the texture feature changes between the epidermal layer and the dermal layer are considered to set the first anti-counterfeiting index value. Specifically, in the above step, the determining a first anti-counterfeiting index value on the basis of the texture direction feature values of the epidermal layer and the texture direction feature values of the dermal layer may include the following steps:

for each target fingerprint, obtaining a texture change rate of the target fingerprint on the basis of the texture direction feature value of the epidermal layer and the texture direction feature value of the dermal layer, and setting a first anti-counterfeiting index value corresponding to the target fingerprint on the basis of the texture change rate.

It needs to be noted that, those skilled in the art may adaptively set the first anti-counterfeiting index value according to the texture change rate in the context of an actual application, for example, the fingerprint change rate of the target fingerprint is 0.36, and the first anti-counterfeiting index value is set to 0.4, which means that the texture change rate is within 0.4.

Further, in the above step, the obtaining a texture change rate of the target fingerprint on the basis of the texture direction feature value of the epidermal layer and the texture direction feature value of the dermal layer may include the following steps:

- obtaining pixel blocks generating texture direction changes on the basis of the texture direction feature value of the epidermal layer and the texture direction feature value of the dermal layer, and marking the pixel blocks as overlay blocks; and
- determining a texture change rate of the target fingerprint on the basis of a ratio value between a number of the overlay blocks and a total number of the pixel blocks.

The texture direction feature value $OF_0$ of the epidermal layer in the third time sequence (such as first-frame fingerprint data) is taken as a basis, $OF_0$ represents a direction field in the third time sequence, a direction field $OF_j$ of the fingerprint image in the different time sequences (such as the fourth time sequence with a time sequence difference) is calculated, and a change rate between the direction field and $OF_0$ is compared:

$$Diff_{OF_{0,j}} = |OF_j - OF_0|$$

$$OverlayRate = \frac{\text{COUNT}(Diff_{OF_{0,j}} > 1 \text{ and } Diff_{OF_{0,j}} < 7)}{64}$$

wherein $Diff_{OF}$ represents that the pixel blocks generate texture direction changes between the third time sequence and the fourth time sequence, COUNT($Diff_{OF_{0j}}$>1 and $Diff_{OF_{0j}}$<7) represents the pixel blocks generating the texture direction changes, i.e., a case that the texture direction changes of the pixel blocks are greater than 1 and less than 7, and 64 is a total number of the pixel blocks.

Figure 9A:
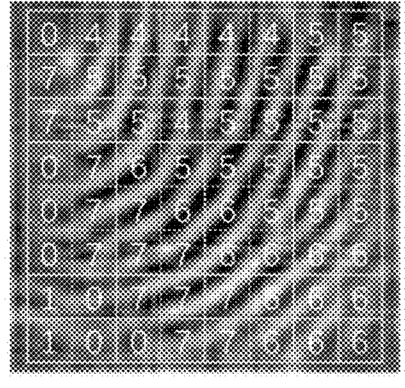
FIG. 9A is a schematic diagram of a fingerprint image and a direction field of a fake finger in a third time sequence.
Figure 9B:
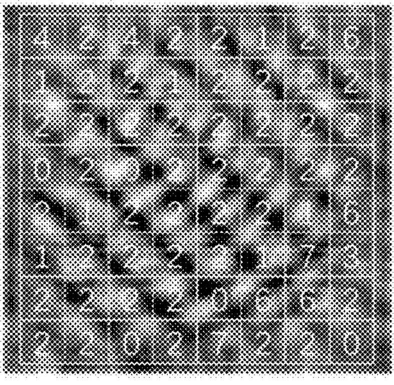
FIG. 9B is a schematic diagram of a fingerprint image and a direction field of a fake finger in a fourth time sequence.

Through an experimental comparison, direction fields of the real fingerprint and the fake fingerprint in a first frame (1100 ns) and subsequent frames (e.g. 1900 ns) are obtained, the fake fingerprint is pressed by diagonal stripes, the fingerprint images of different frames and direction fields of the fingerprint images are acquired as shown in FIG. 9A and FIG. 9B, and it can be obviously seen that the fingerprint image obtained at 1900 ns is overlaid with textures of stripe heads behind the fake fingerprint, so that it indicates that the proposed manner of distinguishing the real fingerprint and the fake fingerprint through the fingerprint texture changes in the different time sequences is reasonable:

It may be obtained through counting that a number of the blocks with the texture changes, of the fake fingerprint at 1900 ns and 1100 ns is 51, then a overlay rate of the blocks at 1900 ns is $$\frac{51}{64} = 0.7968.$$

Figure 10A:
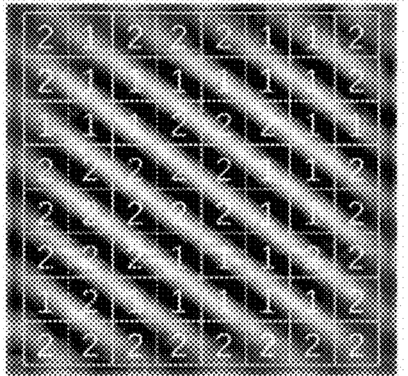
FIG. 10A is a schematic diagram of a fingerprint image and a direction field of stripe heads in the third time sequence.
Figure 10B:
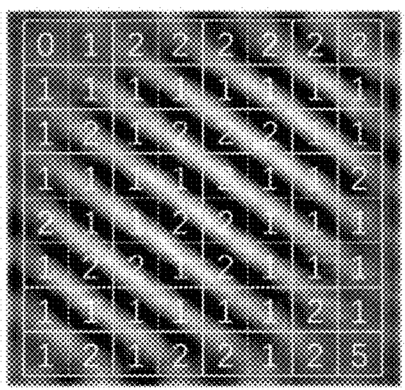
FIG. 10B is a schematic diagram of a fingerprint image and a direction field of the stripe heads in the fourth time sequence.

The stripe heads of the diagonal stripes are shown in FIG. 10A and FIG. 10B, and a number of the blocks with the fingerprint texture changes at 1900 ns and 1100 ns is 2, then a overlay rate of the blocks at 1900 ns is $$\frac{2}{64} = 0.0313.$$

That is to say, the texture changes influenced by the stripe heads are only 0.0313.

In some embodiments, the texture change rates in more time sequences group may also be obtained, so that the fingerprint anti-counterfeiting effect is improved.

In some embodiments, the first anti-counterfeiting index value may be set in combination with data such as the ridge-valley parameter values and texture change data in the different time sequences in the above implementation manner, that is, the first anti-counterfeiting index value includes anti-counterfeiting index values (threshold values) set according to various feature parameter values, during identification for the fingerprint to be identified, parameter data corresponding to the anti-counterfeiting index values are obtained respectively, and compared with respective threshold values, and when all the comparisons are passed, it may be determined that the fingerprint to be identified is a real fingerprint of the target fingerprint, otherwise, the fingerprint to be identified is a forged fingerprint of the target fingerprint. Alternatively, for the different anti-counterfeiting index values, respective corresponding ratios are set to set the first anti-counterfeiting index value, and during fingerprinting, parameter data corresponding to the anti-counterfeiting index values are obtained respectively and multiplied by the respective corresponding ratios respectively to obtain a final value, and whether the final value meets a value range corresponding to the first anti-counterfeiting index value is judged. In other instances, the first anti-counterfeiting index value may also be set in other manners, the present embodiment does not go into much detail on this.

Figure 11:
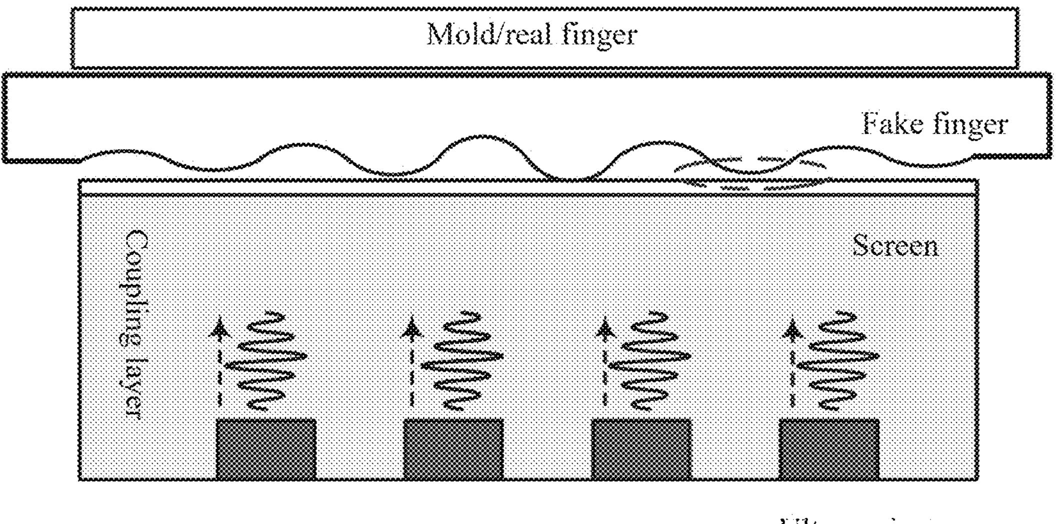
FIG. 11 is another schematic diagram of the ultrasonic signal reception model when a mold or a fake finger presses.

In the embodiment, it is further considered that the real finger and the fake fingerprint have different fitting conditions with a screen in a fingerprint acquisition process, the fake fingerprint needs to be pressed by an external force, and due to differences in a material, a hardness, and a pressing force of the fake fingerprint, weak edges are more prone to appearing in the fake fingerprint during acquisition, that is, there is a small number of high-frequency signals at the parts, and a small value is represented in the gradient. Due to the fact that the fake fingerprint made of a hard material has a certain hardness, has a shape which is not prone to changing, and is difficult to fully fit with the screen while being pressed; and the fake fingerprint made of a soft material is more prone to deformation while being pressed, and therefore is prone to wrinkling while being pressed and difficult to realize smooth fitting with the screen. Due to the fact that an ultrasound fingerprint influences intensity of an echo through acoustic impedance differences, ridge-valley textures are formed, and due to incomplete fitting with the screen at areas with poor fitting, as shown in FIG. 11, air enters between the fake fingerprint and the screen, and weak edges appear in the areas with poor fitting.

Figure 12:
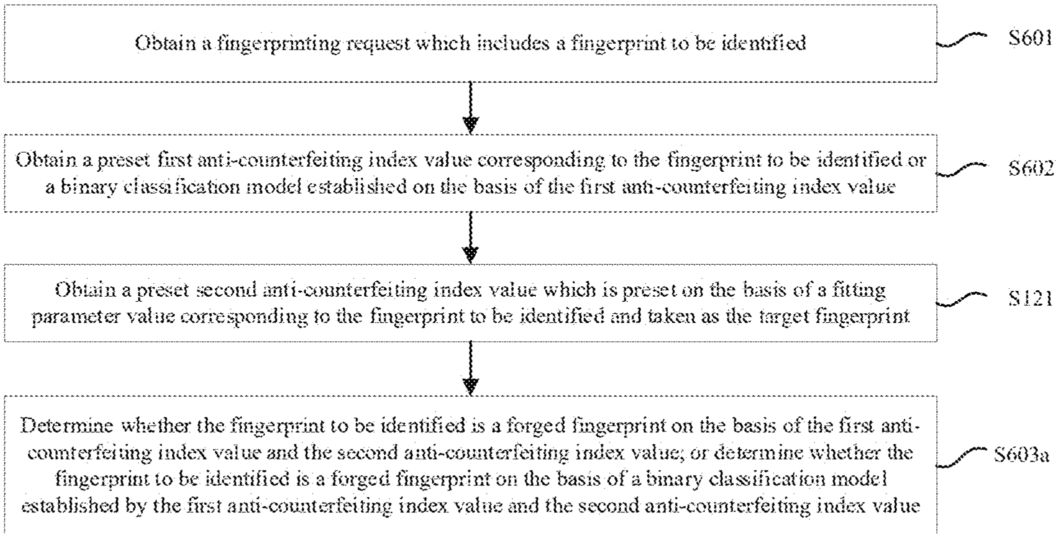
FIG. 12 is a schematic flow diagram of another fingerprint anti-counterfeiting processing method provided by the example of the present application.

In view of this, in the example of the present application, in order to further improve the fingerprint anti-counterfeiting effect, another fingerprint anti-counterfeiting processing method is provided, as shown in FIG. 12, in addition to the above steps S601 to S603, the method further includes step S121, and the step S603 is further divided into step S603*a*.

Step S121, obtaining a preset second anti-counterfeiting index value which is preset on the basis of a fitting parameter value corresponding to the fingerprint to be identified and taken as the target fingerprint; and step S603*a*, determining whether the fingerprint to be identified is a forged fingerprint on the basis of the first anti-counterfeiting index value and the second anti-counterfeiting index value; or determining whether the fingerprint to be identified is a forged fingerprint on the basis of a binary classification model established on the basis of the first anti-counterfeiting index value and the second anti-counterfeiting index value.

In the embodiment, the fitting parameter value may be used for representing a fitting degree between the fingerprint and a fingerprint acquisition apparatus (for example, an ultrasonic sensing apparatus).

In a feasible implementation, whether the fingerprint to be identified is a forged fingerprint is determined on the basis of the first anti-counterfeiting index value and the second anti-counterfeiting index value, parameter data corresponding to the first anti-counterfeiting index value and the second anti-counterfeiting index value of the fingerprint to be identified may be obtained respectively, and compared respectively, and when the comparisons are both passed, the fingerprint to be identified is determined to be a real fingerprint corresponding to the target fingerprint, otherwise, the fingerprint to be identified is determined to be a forged fingerprint corresponding to the target fingerprint.

In other feasible implementations, corresponding anti-counterfeiting ratios (similar to the above identification manner in which the first anti-counterfeiting index value includes a plurality of types of anti-counterfeiting index values), and identification orders with regard to the first anti-counterfeiting index value and the second anti-counterfeiting index value (for example, whether the fingerprint to be identified is a forged fingerprint is determined firstly according to the first anti-counterfeiting index value, and when the fingerprint to be identified is identified to be not a forged fingerprint, identification is further carried out according to the second anti-counterfeiting index value, and vice versa) may further be set for the first anti-counterfeiting index value and the second anti-counterfeiting index value.

In another feasible implementation, a binary classification model may be trained on the basis of the first anti-counterfeiting index value and the second anti-counterfeiting index value, and the model training manner has been described in the above example, and will not be repeated herein.

Further, in the above step S121, the presetting the second anti-counterfeiting index value may include the following steps:

acquiring a fifth fingerprint image of the target fingerprint, and obtaining fingerprint gradient information of the pixel points in the fifth fingerprint image; and screening out valid fingerprint gradient information that meets a preset condition and the pixel points corresponding to the valid fingerprint gradient information from the fingerprint gradient information of the pixel points;

obtaining an valid gradient proportion of the target fingerprint on the basis of a number of the pixel points corresponding to the valid fingerprint gradient information; and/or, obtaining an average valid gradient value on the basis of the valid fingerprint gradient information and the number of the pixel points corresponding to the valid fingerprint gradient information; and obtaining a fitting parameter value of the target fingerprint on the basis of the valid gradient proportion and/or the average valid gradient value.

Figures 13A, 13B, 13C:
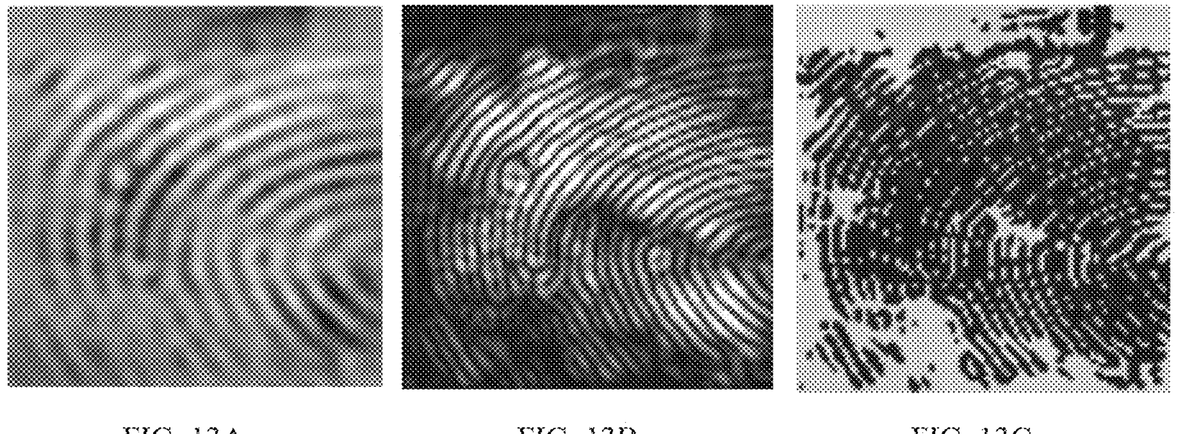
FIG. 13A is a schematic diagram of an original fingerprint image in the example of the present application.
FIG. 13B is a gradient diagram corresponding to the original fingerprint image in the example of the present application.
FIG. 13C is an effective area diagram corresponding to the original fingerprint image in the example of the present application.

In combination with FIG. 13A to FIG. 13C, FIG. 13A is an original fingerprint image (i.e. a fifth fingerprint image), FIG. 13B is a gradient diagram, and FIG. 13C is an valid area, and in the example, manners of calculating an valid gradient and an valid gradient proportion may be as follows:

step 1: extracting fingerprint edge information through a Sobel operator, and taking I as an original fingerprint image with a size of Row*Col, and calculating an image gradient Edge.

$$G_x = \begin{bmatrix} -1 & 0 & 1 \\ -2 & 0 & 2 \\ -1 & 0 & 1 \end{bmatrix} * I,\ G_y = \begin{bmatrix} 1 & 2 & 1 \\ 0 & 0 & 0 \\ -1 & -2 & -1 \end{bmatrix} * I,$$

$$\text{Edge} = \sqrt{G_x^2 + G_y^2}$$

wherein $G_x$ represents gradient information in the x direction, and $G_y$ represents gradient information in the y direction.

In the embodiment, fingerprint gradient information of pixel points in the fifth fingerprint image is obtained, fingerprint edge information in the image may be extracted through the Sobel operator, and the fingerprint gradient information of the pixel points is obtained on the basis of the fingerprint edge information.

It may be understood that, the Sobel operator is an important processing method in the field of computer vision. The Sobel operator is mainly used for obtaining a first-order gradient of a digital image, and is commonly used for edge detection. The Sobel operator may weight differences in gray values of an upper neighborhood, a lower neighborhood, a left neighborhood and a right neighborhood of each pixel in the image, and reach extreme values at edges, so as to detect the edges.

Step 2: in the obtained gradient information Edge, further obtaining gradient values of the pixel points, recording the gradient values greater than 50 to be valid, and counting all the valid gradient values and an average valid gradient value:

$$GradMean = \frac{\sum_{i=1, Edge_i \geq 50}^{i=Row*Col} Edge_i}{Cnt(Edge_i \geq 50)}$$

where $Edge_i$ is gradient information of the i-th pixel point of the target fingerprint, Cnt(x≥n) represents a number of the pixel points with x greater than or equal to n, GradMean represents the average valid gradient value, and $$\sum_{i=1,Edge_i\geq 50}^{i=Row*Col} Edge_i$$

represents all the valid gradient values.

In the embodiment, the gradient values greater than or equal to 50 are recorded to be the valid gradient values. It needs to be noted that, in addition to that the gradient values greater than or equal to 50 are considered to be the valid gradient values that meet a preset condition, those skilled in the art may also adaptively set the valid fingerprint gradient information that meets a preset condition in combination with an actual application.

Step 3: calculating an valid gradient proportion, and obtaining the valid gradient proportion according to a following formula:

$$ValidRatio = \frac{Cnt(Edge_i \geq 50)}{\text{Row}*Col}$$

where ValidRatio represents the valid gradient proportion, $Cnt(Edge_i \geq 50)$ represents a number of the pixel points, and Row*Col represents a number of all the pixel points in the image.

In conclusion, in the embodiment, the epidermal layer information and the dermal layer information of the fingerprint are obtained on the basis of a consistency principle of the epidermal textures and the dermal textures of the finger of the human body, the real fingerprint and the fake fingerprint can be well distinguished through controlling the indexes such as the respective ridges and valleys, and the contrasts in the two time sequences, so that the anti-counterfeiting purpose is achieved; due to the fact that acoustic impedance of some materials may be close to that of the finger, using only indexes such as a contrast in a certain time sequence is not sufficient, and in the design solution of the embodiment, the real finger and the fake finger are distinguished through calculating the contrasts and the ridge-valley ratio value between the two time sequences, and then controlling the threshold value ranges of the ratio indexes between the two time sequences, and the ratio indexes are added to the distinguishing for the real finger and the fake finger, so that the distinguishing degree for the real fingerprint and the fake fingerprint is increased, and the anti-counterfeiting performance is optimized; the identification effect on the real fingerprint and the fake fingerprint is further improved through comparing the texture change rates of the fingerprint in the different time sequences, specifically, the fingerprint texture features are represented by the blocked fingerprint direction fields in the different time sequences, other calculation manners for the direction fields are compared, and the direction accuracy of the pixel points may be better increased by the pixel gradients in the neighborhoods; through extracting the gradient information of the image, the real fingerprint and the fake fingerprint are further identified in the whole fingerprint image with regard to the valid gradient intensity proportions; in addition, the series of features proposed above may be sent into the SVM binary classification model as feature vectors for learning and training, and finally an anti-counterfeiting SVM model capable of distinguishing the real fingerprint and the fake fingerprint is obtained, so that the fingerprint anti-counterfeiting effect is improved.

Figure 14:
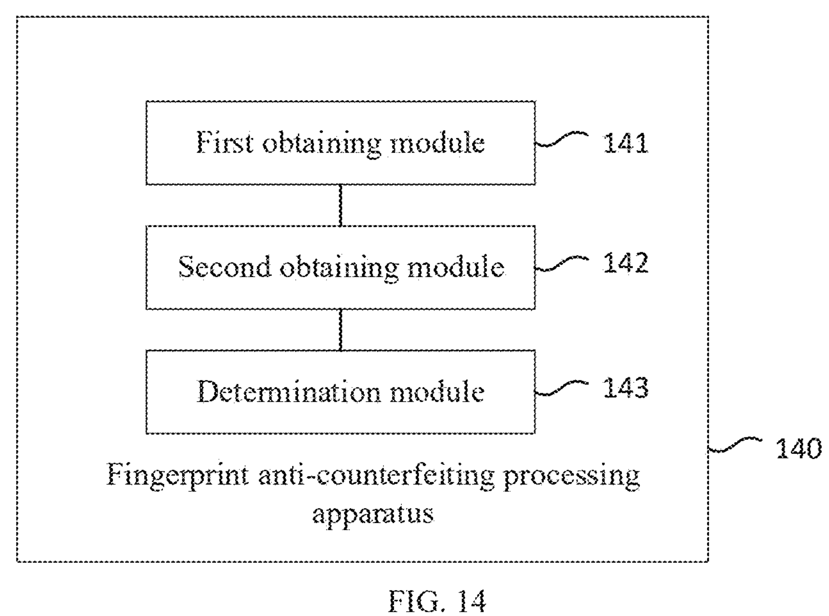
FIG. 14 is a schematic structure diagram of a fingerprint anti-counterfeiting processing apparatus provided by the example of the present application.

The embodiment of the present application correspondingly further provides a fingerprint anti-counterfeiting processing apparatus, as shown in FIG. 14, the fingerprint anti-counterfeiting processing apparatus 140 includes a first obtaining module 141, a second obtaining module 142, and a determination module 143, wherein the first obtaining module 141 is configured to obtain a fingerprinting request which includes a fingerprint to be identified;

the second obtaining module 142 is configured to obtain a preset first anti-counterfeiting index value corresponding to the fingerprint to be identified or a binary classification model established on the basis of the first anti-counterfeiting index value; and the determination module 143 is configured to determine whether the fingerprint to be identified is a forged fingerprint on the basis of the first anti-counterfeiting index value or the binary classification model;

wherein the first anti-counterfeiting index value is a value preset on the basis of obtained feature parameter values corresponding to the fingerprint to be identified and taken as a target fingerprint in different time sequences.

In an implementation manner, a first setting module is further included, and configured to preset a first anti-counterfeiting index value, and specifically includes:

an obtaining unit, configured to, for each target fingerprint, obtain feature parameter values of an epidermal layer and feature parameter values of a dermal layer, which respectively correspond to the target fingerprint in different time sequences; and a setting unit, configured to respectively set a first anti-counterfeiting index value corresponding to each target fingerprint on the basis of the feature parameter values of the epidermal layer and the feature parameter values of the dermal layer.

In an implementation manner, a model establishment module is further included, and configured to establish the binary classification model, and specifically includes:

a training unit, configured to train a preset binary classification model on the basis of the first anti-counterfeiting index value to obtain the binary classification model; and the determination module 143 is specifically configured to analyze the fingerprint to be identified through adopting the binary classification model to obtain a binary classification result, and determine whether the fingerprint to be identified is a forged fingerprint on the basis of the binary classification result.

In an implementation manner, the obtaining unit includes:

a first acquisition sub-unit, configured to acquire a first fingerprint image of the target fingerprint in a first time sequence, determine ridge positions and valley positions in the first fingerprint image, and obtain a ridge parameter value and a valley parameter value of an epidermal layer according to the ridge positions and the valley positions in the first fingerprint image; and a second acquisition sub-unit, configured to acquire a second fingerprint image of the target fingerprint in a second time sequence which has a preset time sequence difference with the first time sequence, determine ridge positions and valley positions in the second fingerprint image, and obtain a ridge parameter value and a valley parameter value of a dermal layer according to the ridge positions and the valley positions in the second fingerprint image.

In an implementation manner, the setting unit includes:

a contrast obtaining sub-unit, configured to, for each target fingerprint, obtain a fingerprint contrast of the epidermal layer on the basis of the ridge parameter value and the valley parameter value of the epidermal layer, and obtain a fingerprint contrast of the dermal layer on the basis of the ridge parameter value and the valley parameter value of the dermal layer; and an index value determination sub-unit, configured to determine an anti-counterfeiting index value in the first time sequence on the basis of the fingerprint contrast of the epidermal layer, and the ridge parameter value and the valley parameter value of the epidermal layer, and determine an anti-counterfeiting index value in the second time sequence on the basis of the fingerprint contrast of the dermal layer, and the ridge parameter value and the valley parameter value of the dermal layer; and a first setting sub-unit, configured to set a first anti-counterfeiting index value corresponding to the target fingerprint on the basis of the anti-counterfeiting index value in the first time sequence and the anti-counterfeiting index value in the second time sequence.

In an implementation manner, the setting unit includes:

a parameter ratio value obtaining sub-unit, configured to, for each target fingerprint, determine a ridge parameter ratio value between the first time sequence and the second time sequence on the basis of the ridge parameter value of the epidermal layer and the ridge parameter value of the dermal layer; and determine a valley parameter ratio value between the first time sequence and the second time sequence on the basis of the valley parameter value of the epidermal layer and the valley parameter value of the dermal layer;

a contrast ratio value obtaining sub-unit, configured to obtain a fingerprint contrast of the epidermal layer on the basis of the ridge parameter value and the valley parameter value of the epidermal layer, and obtain a fingerprint contrast of the dermal layer on the basis of the ridge parameter value and the valley parameter value of the dermal layer; and determine a contrast ratio value between the first time sequence and the second time sequence on the basis of the fingerprint contrast of the epidermal layer and the fingerprint contrast of the dermal layer; and a second setting sub-unit, configured to determine anti-counterfeiting index values among the different time sequences on the basis of the ridge parameter ratio value, the valley parameter ratio value and the contrast ratio value between the first time sequence and the second time sequence, and set a first anti-counterfeiting index value corresponding to the target fingerprint on the basis of the anti-counterfeiting index values among the different time sequences.

In an implementation manner, the obtaining unit includes:

a first gradient obtaining sub-unit, configured to acquire a third fingerprint image of the target fingerprint in a third time sequence, obtain a gradient of each pixel point in the third fingerprint image in a preset number of directions, and respectively take a direction with the minimum gradient as a first gradient direction of each pixel point;

a first texture obtaining sub-unit, configured to determine a first texture direction of a pixel block where each pixel point is located on the basis of the first gradient direction of each pixel point, and obtain a texture direction feature value of the epidermal layer on the basis of the first texture directions of the pixel blocks; and a second gradient obtaining sub-unit, configured to acquire a fourth fingerprint image of the target fingerprint in a fourth time sequence which has a preset time sequence difference with the third time sequence, obtain a gradient of each pixel point in the fourth fingerprint image in a preset number of directions, and respectively take a direction with the minimum gradient as a second gradient direction of each pixel point; and a first texture obtaining sub-unit, configured to determine a second texture direction of a pixel block where each pixel point is located on the basis of the second gradient direction of each pixel point, and obtain a texture direction feature value of the dermal layer on the basis of the second texture directions of the pixel blocks.

In an implementation manner, the setting unit includes:

a third setting sub-unit, configured to, for each target fingerprint, obtain a texture change rate of the target fingerprint on the basis of the texture direction feature value of the epidermal layer and the texture direction feature value of the dermal layer, and set a first anti-counterfeiting index value corresponding to the target fingerprint on the basis of the texture change rate.

In an implementation manner, the obtaining a texture change rate of the target fingerprint on the basis of the texture direction feature value of the epidermal layer and the texture direction feature value of the dermal layer specifically is: obtaining pixel blocks generating texture direction changes on the basis of the texture direction feature value of the epidermal layer and the texture direction feature value of the dermal layer, and marking the pixel blocks as overlay blocks; and determining a texture change rate of the target fingerprint on the basis of a ratio value between a number of the overlay blocks and a total number of the pixel blocks.

In an implementation manner, the apparatus further includes:

a third obtaining module, configured to obtain a preset second anti-counterfeiting index value which is preset on the basis of a fitting parameter value corresponding to the fingerprint to be identified and taken as the target fingerprint; and the determination module 143 is specifically configured to determine whether the fingerprint to be identified is a forged fingerprint on the basis of the first anti-counterfeiting index value and the second anti-counterfeiting index value; or determine whether the fingerprint to be identified is a forged fingerprint on the basis of a binary classification model established on the basis of the first anti-counterfeiting index value and the second anti-counterfeiting index value.

In an implementation manner, a second setting module is further included, and configured to preset a second anti-counterfeiting index value, and specifically includes:

a fingerprint gradient obtaining unit, configured to acquire a fifth fingerprint image of the target fingerprint, and obtain fingerprint gradient information of the pixel points in the fifth fingerprint image; and a screening unit configured to screen out valid fingerprint gradient information that meets a preset condition and the pixel points corresponding to the valid fingerprint gradient information from the fingerprint gradient information of the pixel points;

an valid gradient obtaining unit configured to obtain an valid gradient proportion of the target fingerprint on the basis of a number of the pixel points corresponding to the valid fingerprint gradient information; and/or, obtain an average valid gradient value on the basis of the valid fingerprint gradient information and the number of the pixel points corresponding to the valid fingerprint gradient information; and a fitting parameter obtaining unit, configured to obtain a fitting parameter value of the target fingerprint on the basis of the valid gradient proportion and/or the average valid gradient value.

The above apparatus provided by the example of the present application may be used for executing the technical solution of the fingerprint anti-counterfeiting processing method in the above example, and a realization principle and a technical effect of the above apparatus are similar, which will not be repeated herein.

It needs to be noted that, it should be understood that division for modules of the above apparatus is merely a division for logical functions, and in actual realization, the modules may be completely or partially integrated into a physical entity, or may be physically separated. Moreover, these modules may be completely realized in a form of calling software through a processing element; or these modules may be completely realized in a form of hardware; or part of the modules may be realized in a form of calling software through a processing element, and part of the modules are realized in a form of hardware. For example, the first obtaining module 141 may be a processing element arranged separately, or may be integrated into a certain chip of the above apparatus to be realized, or may be stored in a memory of the above apparatus in a form of a program code, and called by a certain processing element of the above apparatus, and the function of the first obtaining module 141 is executed. Realization for the other modules is similar. In addition, these modules may be completely or partially integrated together, or realized independently. The processing element herein may be an integrated circuit with signal processing capability. In a realization process, the steps of the above method, or the above modules may be completed through an integrated logic circuit of hardware in a processor element, or an instruction in a form of software.

The example of the present application correspondingly further provides a computer storage medium, where a computer-executable instruction is stored in the computer-readable storage medium, and the computer-executable instruction is used for realizing the fingerprint anti-counterfeiting processing method while being executed by a processor.

The above medium provided by the example of the present application may be used for executing the technical solution of the fingerprint anti-counterfeiting processing method in the above example, and a realization principle and a technical effect of the above medium are similar, which will not be repeated herein.

Figure 15:
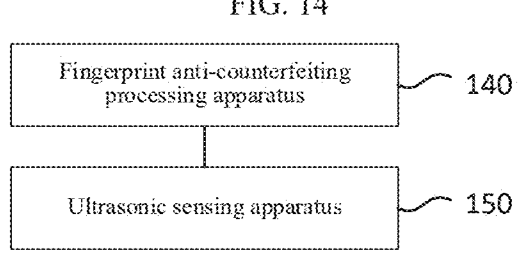
FIG. 15 is a schematic structure diagram of a fingerprint anti-counterfeiting processing system provided by the example of the present application.

The example of the present application correspondingly further provides a fingerprint anti-counterfeiting system, and as shown in FIG. 15, the fingerprint anti-counterfeiting system includes a fingerprint anti-counterfeiting processing apparatus 140 which is used for executing the above method, and an ultrasonic sensing apparatus 150, where the fingerprint anti-counterfeiting processing apparatus 140 is used for being electrically connected with the ultrasonic sensing apparatus 150, so as to realize ultrasonic fingerprint anti-counterfeiting detection.

Figure 16:
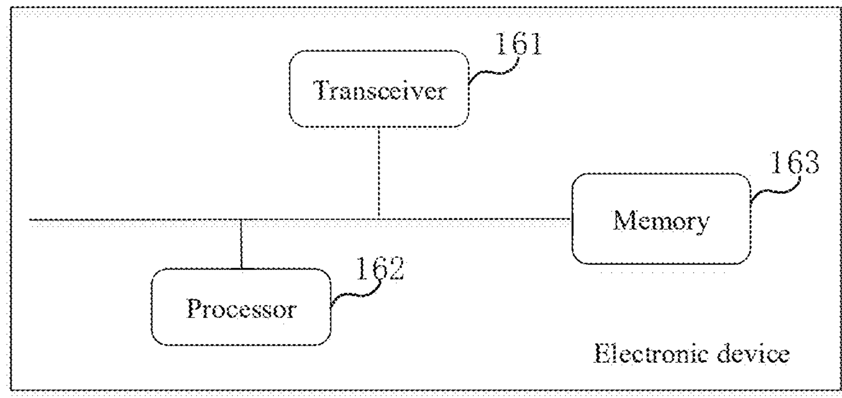
FIG. 16 is a schematic structure diagram of an electronic device provided by the example of the present application.

The example of the present application further provides an electronic device, where the electronic device includes the fingerprint anti-counterfeiting processing system. As shown in FIG. 16, the electronic device may include: a transceiver 161, a processor 162, and a memory 163.

The processor 162 executes a computer-executable instruction stored in the memory, so that the processor 162 calls the above fingerprint anti-counterfeiting processing system to execute the solution in the above example. The processor 162 may be a general-purpose processor, and includes a central processing unit (CPU), a network processor (NP), etc; and the processor 162 may also be a digital signal processor (DSP), an application-specific integrated circuit (ASIC), a field-programmable gate array (FPGA) or other programmable logic devices, discrete gates or transistor logic devices, and discrete hardware components.

The memory 163 is connected with the processor 162 through a system bus and completes mutual communication, and the memory 163 is used for storing a computer program instruction.

The transceiver 161 may be used for obtaining a task to be run, and configuration information of the task to be run.

The system bus may be a peripheral component interconnect (PCI) bus or an extended industry standard architecture (EISA) bus. The system bus may be divided into an address bus, a data bus, a control bus, etc. For ease of representation, only one thick line is used for representing in the drawing, but it does not indicate that there is only one bus or one type of bus. The transceiver is used for realizing communications between a database access apparatus and other computers (such as a client, a read-write library, and a read-only library). The memory may include a random access memory (RAM), and may further include a non-volatile memory.

The above device provided by the example of the present application may be used for executing the technical solution of the fingerprint anti-counterfeiting processing method in the above example, and a realization principle and a technical effect of the above device are similar, which will not be repeated herein.

The example of the present application further provides a chip for running an instruction, where the chip is used for executing the technical solution of the fingerprint anti-counterfeiting processing method in the above example.

The example of the present application further provides a computer-readable storage medium, where a computer instruction is stored in the computer-readable storage medium, and when the computer instruction is run in a computer, the computer is enabled to execute the technical solution of the fingerprint anti-counterfeiting processing method in the above example.

The example of the present application further provides a computer program product, where the computer program product includes a computer program which is stored in a computer-readable storage medium, at least one processor may read the computer program from the computer-readable storage medium, and the technical solution of the fingerprint anti-counterfeiting processing method in the above example may be realized when the at least one processor executes the computer program.

In the several examples provided by the present application, it should be understood that, the disclosed device and method may also be realized in other manners. For example, the device example described above is merely illustrative, for example, division for modules is merely a logical function division, and there may be other division manners in actual realization, for example, a plurality of modules may be combined or may be integrated into another system, or some features may be ignored or not executed. On the other hand, the displayed or discussed mutual coupling or direct coupling or communication connections may be indirect coupling or communication connections through some interfaces, apparatuses or modules, and may be in electrical, mechanical, or other forms.

The modules described as separate components may or may not be physically separated, and components displayed as the modules may or may not be physical units, that is, the components may be located in one place, or may be distributed into a plurality of network units. Part or all of the modules may be selected according to an actual need to realize the solutions of the examples.

In addition, the function modules in the examples of the present application may be integrated into one processing unit, or the modules may exist separately physically, or two or more modules may integrated into one unit. The units formed by the above modules may be realized in a form of hardware, and may also be realized in a form of hardware and software function units.

The above integrated modules realized in a form of software function modules may be stored in a computer-readable storage medium. The above software function modules are stored in a storage medium, and a plurality of instructions are included and used for enabling a computer device (which may be a personal computer, a server, a network device, etc.) or a processor to execute part of the steps of the methods in the examples of the present application.

It should be understood that, the above processor may be a central processing unit (CPU), and may also be other general-purpose processors, digital signal processors (DSPs), application-specific integrated circuits (ASICs), etc. The general-purpose processor may be a microprocessor, or the processor may be any conventional processor, etc. The steps of the method disclosed by the present application may be directly embodied to be executed and completed by a hardware processor, or may be executed and completed by means of a combination of hardware and software modules in the processor.

The memory may include a high-speed RAM memory, may further include a non-volatile memory (NVM), such as at least one magnetic disc memory, and may also be a U disk, a mobile hard disk, a read-only memory, a magnetic disk or an optical disc, etc.

The bus may be an industry standard architecture (ISA) bus, a peripheral component interconnect (PCI) bus, or an extended industry standard architecture (EISA) bus, etc. The bus may be divided into an address bus, a data bus, a control bus, etc. For ease of representation, the bus in the drawings of the present application is not limited to be only one bus or one type of bus.

The above storage medium may be realized through any type of volatile or non-volatile memory devices, or a combination thereof, such as a static random access memory (SRAM), an electrically-erasable programmable read-only memory (EEPROM), an erasable-programmable read-only memory (EPROM), a programmable read-only memory (PROM), a read-only memory (ROM), a magnetic memory, a flash memory, a magnetic disk or an optical disk. The storage medium may be any available medium accessible by a general-purpose or special-purpose computer.

An exemplary storage medium is coupled to a processor, so that the processor can read information from the storage medium, and may write information into the storage medium. Certainly, the storage medium may also be a component of the processor. The processor and the storage medium may be located in an application-specific integrated circuits (ASIC). Certainly, the processor and the storage medium may also exist in an electronic control unit or a master control device as discrete assemblies.

Those of ordinary skill in the art may understand that: all or part of the steps for realizing the above method examples may be completed through hardware related to a program instruction. The above program may be stored in a computer-readable storage medium. When the program is executed, the steps including the above method examples are executed; and the above storage medium includes: various media capable of storing a program code, such as a ROM, a RAM, a magnetic disk, or an optical disk.

It may be understood that, various digital numbers involved in the examples of the present application are merely for distinguishing for ease of description, and are not used for limiting the scope of the examples of the present application. In the examples of the present application, the serial numbers of the above processes $d_0$ not mean an execution sequence, and the execution sequence of the processes should be determined by functions and internal logics thereof, but should not constitute any limitation on the implementation processes of the examples of the present application.

Finally, it should be noted that: the above examples are merely used for illustrating the technical solutions of the present application and are not limited thereto; although the present application is described in detail with reference to the above examples, those of ordinary skill in the art should understand that: the technical solutions described in the above examples may still be modified, or part or all of the technical features may be equivalently substituted; and these modifications or substitutions do not deviate from the essence of the corresponding technical solutions from the scope of the technical solutions of the examples of the present application.

What is claimed is:

1. A fingerprint anti-counterfeiting processing method, comprising:

obtaining a fingerprinting request which includes a fingerprint to be identified;

obtaining a preset first anti-counterfeiting index value corresponding to the fingerprint to be identified or a binary classification model established on the basis of the first anti-counterfeiting index value, and determining whether the fingerprint to be identified is a forged fingerprint on the basis of the first anti-counterfeiting index value or the binary classification model;

wherein the first anti-counterfeiting index value is a value preset on the basis of obtained feature parameter values corresponding to the fingerprint to be identified and taken as a target fingerprint in different time sequences, wherein presetting a first anti-counterfeiting index value comprises:

for each target fingerprint, obtaining feature parameter values of an epidermal layer and feature parameter values of a dermal layer, which respectively correspond to the target fingerprint in different time sequences; and respectively setting a first anti-counterfeiting index value corresponding to each target fingerprint on the basis of the feature parameter values of the epidermal layer and the feature parameter values of the dermal layer.

2. The method according to claim 1, wherein establishing the binary classification model comprises:

training a preset binary classification model on the basis of the first anti-counterfeiting index value to obtain the binary classification model; and the determining whether the fingerprint to be identified is a forged fingerprint on the basis of the first anti-counterfeiting index value or the binary classification model includes:

analyzing the fingerprint to be identified through adopting the binary classification model to obtain a binary classification result, and determining whether the fingerprint to be identified is a forged fingerprint on the basis of the binary classification result.

3. The method according to claim 1, wherein the obtaining feature parameter values of an epidermal layer and feature parameter values of a dermal layer, which respectively correspond to the target fingerprint in different time sequences comprises:

acquiring a first fingerprint image of the target fingerprint in a first time sequence, determining ridge positions and valley positions in the first fingerprint image, and obtaining a ridge parameter value and a valley parameter value of an epidermal layer according to the ridge positions and the valley positions in the first fingerprint image; and, acquiring a second fingerprint image of the target fingerprint in a second time sequence which has a preset time sequence difference with the first time sequence, determining ridge positions and valley positions in the second fingerprint image, and obtaining a ridge parameter value and a valley parameter value of a dermal layer according to the ridge positions and the valley positions in the second fingerprint image.

4. The method according to claim 3, wherein the respectively setting a first anti-counterfeiting index value corresponding to each target fingerprint on the basis of the feature parameter values of the epidermal layer and the feature parameter values of the dermal layer comprises:

for each target fingerprint, obtaining a fingerprint contrast of the epidermal layer on the basis of the ridge parameter value and the valley parameter value of the epidermal layer, and obtaining a fingerprint contrast of the dermal layer on the basis of the ridge parameter value and the valley parameter value of the dermal layer; and determining an anti-counterfeiting index value in the first time sequence on the basis of the fingerprint contrast of the epidermal layer, and the ridge parameter value and the valley parameter value of the epidermal layer, and determining an anti-counterfeiting index value in the second time sequence on the basis of the fingerprint contrast of the dermal layer, and the ridge parameter value and the valley parameter value of the dermal layer; and setting a first anti-counterfeiting index value corresponding to the target fingerprint on the basis of the anti-counterfeiting index value in the first time sequence and the anti-counterfeiting index value in the second time sequence.

5. The method according to claim 3, wherein the respectively setting a first anti-counterfeiting index value corresponding to each target fingerprint on the basis of the feature parameter values of the epidermal layer and the feature parameter values of the dermal layer comprises:

for each target fingerprint, determining a ridge parameter ratio value between the first time sequence and the second time sequence on the basis of the ridge parameter value of the epidermal layer and the ridge parameter value of the dermal layer; and determining a valley parameter ratio value between the first time sequence and the second time sequence on the basis of the valley parameter value of the epidermal layer and the valley parameter value of the dermal layer;

obtaining a fingerprint contrast of the epidermal layer on the basis of the ridge parameter value and the valley parameter value of the epidermal layer, and obtaining a fingerprint contrast of the dermal layer on the basis of the ridge parameter value and the valley parameter value of the dermal layer; and determining a contrast ratio value between the first time sequence and the second time sequence on the basis of the fingerprint contrast of the epidermal layer and the fingerprint contrast of the dermal layer; and determining anti-counterfeiting index values among the different time sequences on the basis of the ridge parameter ratio value, the valley parameter ratio value and the contrast ratio value between the first time sequence and the second time sequence, and setting a first anti-counterfeiting index value corresponding to the target fingerprint on the basis of the anti-counterfeiting index values among the different time sequences.

6. The method according to claim 1, wherein the obtaining feature parameter values of an epidermal layer and feature parameter values of a dermal layer, which respectively correspond to the target fingerprint in different time sequences comprises:

acquiring a third fingerprint image of the target fingerprint in a third time sequence, obtaining a gradient of each pixel point in the third fingerprint image in a preset number of directions, and respectively taking a direction with the minimum gradient as a first gradient direction of each pixel point;

determining a first texture direction of a pixel block where each pixel point is located on the basis of the first gradient direction of each pixel point, and obtaining a texture direction feature value of the epidermal layer on the basis of the first texture directions of the pixel blocks; and, acquiring a fourth fingerprint image of the target fingerprint in a fourth time sequence which has a preset time sequence difference with the third time sequence, obtaining a gradient of each pixel point in the fourth fingerprint image in a preset number of directions, and respectively taking a direction with the minimum gradient as a second gradient direction of each pixel point; and determining a second texture direction of a pixel block where each pixel point is located on the basis of the second gradient direction of each pixel point, and obtaining a texture direction feature value of the dermal layer on the basis of the second texture directions of the pixel blocks.

7. The method according to claim 6, wherein the respectively setting a first anti-counterfeiting index value corresponding to each target fingerprint on the basis of the feature parameter values of the epidermal layer and the feature parameter values of the dermal layer comprises:

for each target fingerprint, obtaining a texture change rate of the target fingerprint on the basis of the texture direction feature value of the epidermal layer and the texture direction feature value of the dermal layer, and setting a first anti-counterfeiting index value corresponding to the target fingerprint on the basis of the texture change rate.

8. The method according to claim 7, wherein the obtaining a texture change rate of the target fingerprint on the basis of the texture direction feature value of the epidermal layer and the texture direction feature value of the dermal layer comprises:

obtaining pixel blocks generating texture direction changes on the basis of the texture direction feature value of the epidermal layer and the texture direction feature value of the dermal layer, and marking the pixel blocks as overlay blocks; and determining a texture change rate of the target fingerprint on the basis of a ratio value between a number of the overlay blocks and a total number of the pixel blocks.

9. The method according to claim 1, further comprising:

obtaining a preset second anti-counterfeiting index value which is preset on the basis of a fitting parameter value corresponding to the fingerprint to be identified and taken as the target fingerprint; and the determining whether the fingerprint to be identified is a forged fingerprint on the basis of the first anti-counterfeiting index value or the binary classification model includes:

determining whether the fingerprint to be identified is a forged fingerprint on the basis of the first anti-counterfeiting index value and the second anti-counterfeiting index value; or determining whether the fingerprint to be identified is a forged fingerprint on the basis of a binary classification model established on the basis of the first anti-counterfeiting index value and the second anti-counterfeiting index value.

10. The method according to claim 9, wherein presetting a second anti-counterfeiting index value comprises:

acquiring a fifth fingerprint image of the target fingerprint, and obtaining fingerprint gradient information of the pixel points in the fifth fingerprint image; and screening out valid fingerprint gradient information that meets a preset condition and the pixel points corresponding to the valid fingerprint gradient information from the fingerprint gradient information of the pixel points;

obtaining an valid gradient proportion of the target fingerprint on the basis of a number of the pixel points corresponding to the valid fingerprint gradient information; and/or, obtaining an average valid gradient value on the basis of the valid fingerprint gradient information and the number of the pixel points corresponding to the valid fingerprint gradient information; and obtaining a fitting parameter value of the target fingerprint on the basis of the valid gradient proportion and/or the average valid gradient value.

11. A fingerprint anti-counterfeiting processing apparatus, comprising:

a first obtaining module, configured to obtain a fingerprinting request which includes a fingerprint to be identified;

a second obtaining module, configured to obtain a preset first anti-counterfeiting index value corresponding to the fingerprint to be identified or a binary classification model established on the basis of the first anti-counterfeiting index value;

a determination module, configured to determine whether the fingerprint to be identified is a forged fingerprint on the basis of the first anti-counterfeiting index value or the binary classification model;

wherein the first anti-counterfeiting index value is a value preset on the basis of obtained feature parameter values corresponding to the fingerprint to be identified and taken as a target fingerprint in different time sequences;

a first setting module, configured to preset a first anti-counterfeiting index value, and specifically comprising:

an obtaining unit, configured to, for each target fingerprint, obtain feature parameter values of an epidermal layer and feature parameter values of a dermal layer, which respectively correspond to the target fingerprint in different time sequences; and a setting unit, configured to respectively set a first anti-counterfeiting index value corresponding to each target fingerprint on the basis of the feature parameter values of the epidermal layer and the feature parameter values of the dermal layer.

12. The apparatus according to claim 11, further comprising:

a model establishment module, configured to establish the binary classification model, and specifically comprising:

a training unit, configured to train a preset binary classification model on the basis of the first anti-counterfeiting index value to obtain the binary classification model; and the determination module, specifically configured to analyze the fingerprint to be identified through adopting the binary classification model to obtain a binary classification result, and determine whether the fingerprint to be identified is a forged fingerprint on the basis of the binary classification result.

13. The apparatus according to claim 11, wherein the obtaining unit comprises:

a first acquisition sub-unit, configured to acquire a first fingerprint image of the target fingerprint in a first time sequence, determine ridge positions and valley positions in the first fingerprint image, and obtain a ridge parameter value and a valley parameter value of an epidermal layer according to the ridge positions and the valley positions in the first fingerprint image; and a second acquisition sub-unit, configured to acquire a second fingerprint image of the target fingerprint in a second time sequence which has a preset time sequence difference with the first time sequence, determine ridge positions and valley positions in the second fingerprint image, and obtain a ridge parameter value and a valley parameter value of a dermal layer according to the ridge positions and the valley positions in the second fingerprint image.

14. The apparatus according to claim 11, wherein the setting unit comprises:

a contrast obtaining sub-unit, configured to, for each target fingerprint, obtain a fingerprint contrast of the epidermal layer on the basis of the ridge parameter value and the valley parameter value of the epidermal layer, and obtain a fingerprint contrast of the dermal layer on the basis of the ridge parameter value and the valley parameter value of the dermal layer;

an index value determination sub-unit, configured to determine an anti-counterfeiting index value in the first time sequence on the basis of the fingerprint contrast of the epidermal layer, and the ridge parameter value and the valley parameter value of the epidermal layer, and determine an anti-counterfeiting index value in the second time sequence on the basis of the fingerprint contrast of the dermal layer, and the ridge parameter value and the valley parameter value of the dermal layer; and a first setting sub-unit, configured to set a first anti-counterfeiting index value corresponding to the target fingerprint on the basis of the anti-counterfeiting index value in the first time sequence and the anti-counterfeiting index value in the second time sequence.

15. The apparatus according to claim 11, wherein the setting unit comprises:

a parameter ratio value obtaining sub-unit, configured to, for each target fingerprint, determine a ridge parameter ratio value between the first time sequence and the second time sequence on the basis of the ridge parameter value of the epidermal layer and the ridge parameter value of the dermal layer; and determine a valley parameter ratio value between the first time sequence and the second time sequence on the basis of the valley parameter value of the epidermal layer and the valley parameter value of the dermal layer;

a contrast ratio value obtaining sub-unit, configured to obtain a fingerprint contrast of the epidermal layer on the basis of the ridge parameter value and the valley parameter value of the epidermal layer, and obtain a fingerprint contrast of the dermal layer on the basis of the ridge parameter value and the valley parameter value of the dermal layer; and determine a contrast ratio value between the first time sequence and the second time sequence on the basis of the fingerprint contrast of the epidermal layer and the fingerprint contrast of the dermal layer; and a second setting sub-unit, configured to determine anti-counterfeiting index values among the different time sequences on the basis of the ridge parameter ratio value, the valley parameter ratio value and the contrast ratio value between the first time sequence and the second time sequence, and set a first anti-counterfeiting index value corresponding to the target fingerprint on the basis of the anti-counterfeiting index values among the different time sequences.

16. The apparatus according to claim 11, wherein the obtaining unit comprises:

a first gradient obtaining sub-unit, configured to acquire a third fingerprint image of the target fingerprint in a third time sequence, obtain a gradient of each pixel point in the third fingerprint image in a preset number of directions, and respectively take a direction with the minimum gradient as a first gradient direction of each pixel point; a first texture obtaining sub-unit, configured to determine a first texture direction of a pixel block where each pixel point is located on the basis of the first gradient direction of each pixel point, and obtain a texture direction feature value of the epidermal layer on the basis of the first texture directions of the pixel blocks;

a second gradient obtaining sub-unit, configured to acquire a fourth fingerprint image of the target fingerprint in a fourth time sequence which has a preset time sequence difference with the third time sequence, obtain a gradient of each pixel point in the fourth fingerprint image in a preset number of directions, and respectively take a direction with the minimum gradient as a second gradient direction of each pixel point; and a first texture obtaining sub-unit, configured to determine a second texture direction of a pixel block where each pixel point is located on the basis of the second gradient direction of each pixel point, and obtain a texture direction feature value of the dermal layer on the basis of the second texture directions of the pixel blocks.

17. The apparatus according to claim 11, wherein the setting unit comprises:

a third setting sub-unit, configured to, for each target fingerprint, obtain a texture change rate of the target fingerprint on the basis of the texture direction feature value of the epidermal layer and the texture direction feature value of the dermal layer, and set a first anti-counterfeiting index value corresponding to the target fingerprint on the basis of the texture change rate.

18. A fingerprint anti-counterfeiting system, comprising an ultrasonic sensing apparatus and a fingerprint anti-counterfeiting processing apparatus which is used for executing the fingerprint anti-counterfeiting processing method according to claim 1, wherein the fingerprint anti-counterfeiting processing apparatus is used for being electrically connected with the ultrasonic sensing apparatus to realize ultrasonic fingerprint anti-counterfeiting detection.

* * * * *